United States Patent
Wenus et al.

(10) Patent No.: US 10,424,314 B2
(45) Date of Patent: Sep. 24, 2019

(54) TECHNIQUES FOR SPATIAL FILTERING OF SPEECH

(71) Applicant: INTEL CORPORATION, Santa Clara, CA (US)

(72) Inventors: Jakub Wenus, Maynooth (IE); Niall Cahill, Galway (IE); Mark Kelly, Leixlip (IE)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/757,758

(22) Filed: Dec. 23, 2015

(65) Prior Publication Data

US 2017/0186441 A1    Jun. 29, 2017

(51) Int. Cl.
| | |
|---|---|
| *G10L 21/02* | (2013.01) |
| *H04N 7/14* | (2006.01) |
| *H04N 7/15* | (2006.01) |
| *H04N 5/33* | (2006.01) |
| *G10L 21/0216* | (2013.01) |

(52) U.S. Cl.
CPC .......... *G10L 21/0205* (2013.01); *H04N 5/33* (2013.01); *H04N 7/147* (2013.01); *H04N 7/15* (2013.01); *G10L 2021/02166* (2013.01)

(58) Field of Classification Search
None
See application file for complete search history.

(56) References Cited

U.S. PATENT DOCUMENTS

| | | | | |
|---|---|---|---|---|
| 2004/0001137 A1* | 1/2004 | Cutler | ......... | H04N 5/2259 348/14.08 |
| 2008/0013786 A1* | 1/2008 | Lin | ......... | G06K 9/0057 382/103 |
| 2008/0059578 A1* | 3/2008 | Albertson | ......... | G06F 3/016 709/204 |
| 2012/0081504 A1* | 4/2012 | Ng | ......... | H04N 7/142 348/14.08 |

OTHER PUBLICATIONS

Zhang et al., "Maximum Likelihood Sound Source Localization and Beamforming for Directional Microphone Arrays in Distributed Meetings", IEEE Transactions on Multimedia, vol. 10, No. 3, Apr. 2008, 11 pages.

(Continued)

*Primary Examiner* — Maria El-Zoobi

(57) ABSTRACT

A sound source localization apparatus configured to identify a location for an active sound object within a defined physical space is described. The sound source localization apparatus may include an acoustic component, a thermal component, and an analysis component. The acoustic component determines an approximate location for at least one sound object within the defined physical space. The thermal component determines an approximate location for at least one thermal object within the defined physical space. The analysis component identifies the active sound object when the approximate locations for at least one acoustic object and at least one thermal object match. Other embodiments are described and claimed.

16 Claims, 23 Drawing Sheets

(56) References Cited

OTHER PUBLICATIONS

Kilgour et al., "The Ambient Spotlight: Personal Meeting Capture With a Microphone Array", 2011 Joint Workshop on Hands-free Speech Communication and Microphone Arrays, May 30-Jun. 1, 2011, 2 pages.
Droppo et al., "Microsoft Research—Audio Processing project"—available online at: <http://research.microsoft.com/en-us/projects/microphone_array/>, 2015, 5 pages.
Florencio et al., "Microsoft Research—Microphone Array project"—available online at: <http://research.microsoft.com/en-us/projects/microphone_array/>, 2015, 5 pages.
"The Next Generation of Array Microphones", Acoustic Magic, <https://www.acousticmagic.com/>, 2015, 6 pages, (author unknown).
"Ceiling Microphone Array from Clear One", <http://www.clearone.com>, 2015, 1 page (author unknown).
"Amazon Echo", <http://www.amazon.com/Amazon-SK705DI-Echo/dp/B00X4WHP5E>, 7 pages (author unknown).

\* cited by examiner

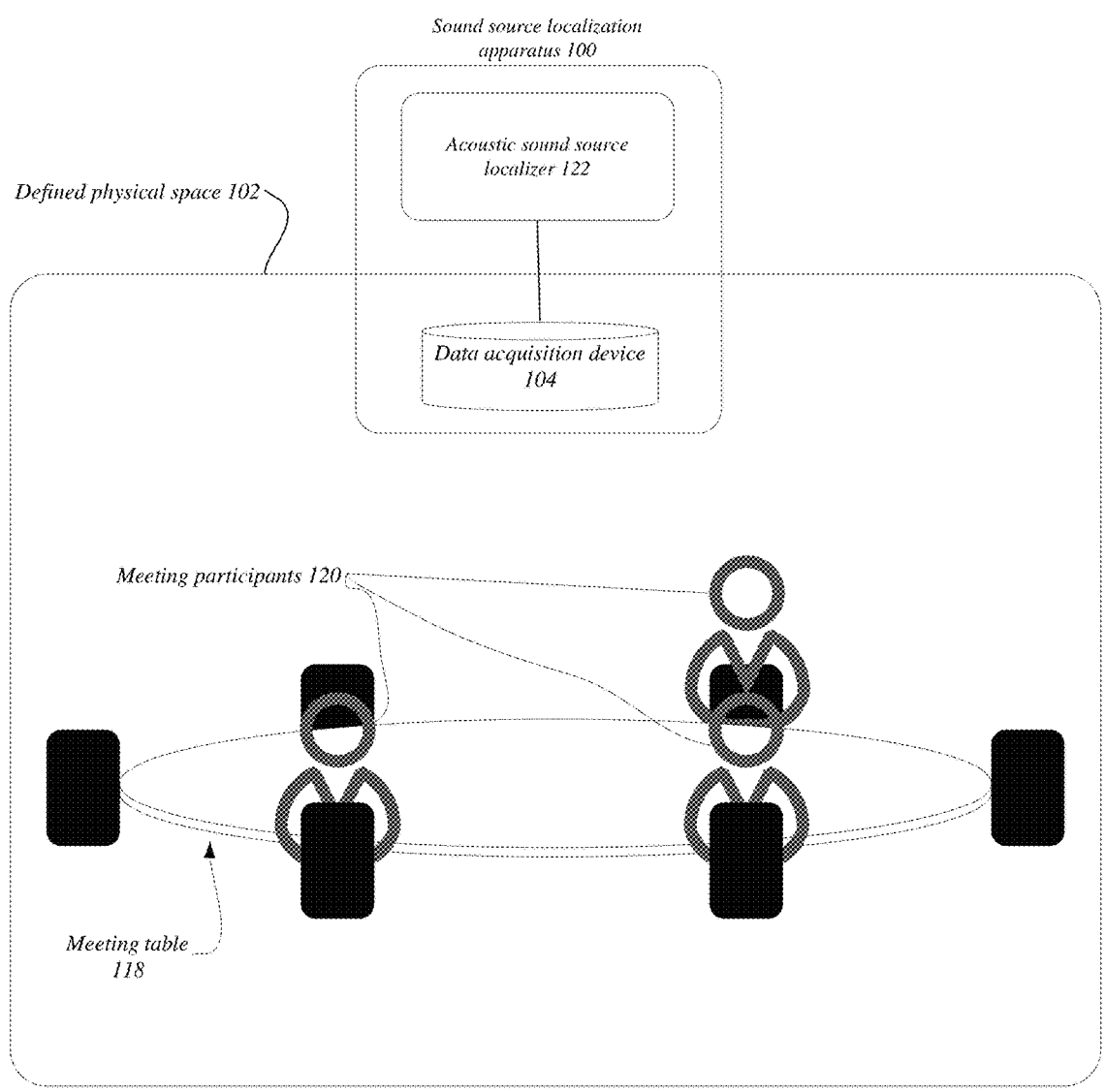

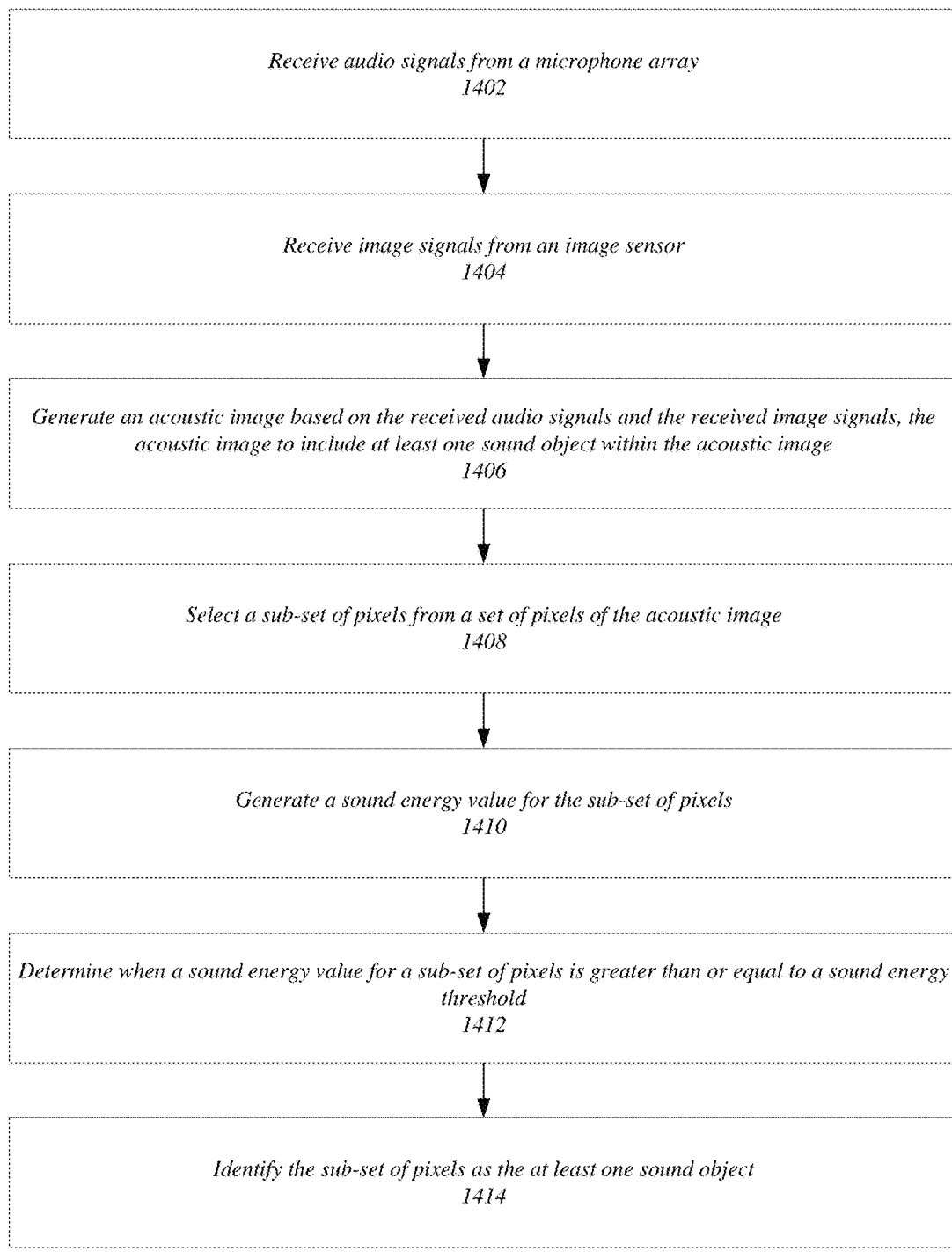

Receive thermal signals from a thermal sensor
1502

Generate a thermal image based on the received thermal signals, the thermal image to include at least one thermal object within the thermal image
1504

Select a sub-set of pixels from a set of pixels of the thermal image
1506

Generate a thermal energy value for the sub-set of pixels
1508

Determine when a temperature value for a sub-set of pixels is lesser than or equal to a thermal energy threshold
1510

Identify the sub-set of pixels as not the at least one thermal object
1512

Receive an acoustic image having at least one sound object and a thermal image having at least one thermal object
1602

Determine whether a first location for the at least one sound object from the acoustic image matches a second location for the at least one thermal object from the thermal image
1604

Identify the at least one sound object as the active sound object when the first and second locations match
1606

Identify the matching first and second locations as the location for the active sound object
1608

*FIG. 18*

Storage Medium 1800

*Computer Executable Instructions for 1300*

*Computer Executable Instructions for 1400*

*Computer Executable Instructions for 1500*

*Computer Executable Instructions for 1600*

*Computer Executable Instructions for 1700*

TECHNIQUES FOR SPATIAL FILTERING OF SPEECH

BACKGROUND

An acoustic camera is a device that can be used to render a visual representation of the sound energy in a defined physical space, such as a conference room used for a meeting. The result of this visualization is sometimes referred to as an acoustic image or an acoustic mapping. Similar to an image produced by a standard camera, an acoustic image is a two-dimensional (2-D) grid of pixels. But, unlike light-based images in which pixels correspond to light modalities within a defined physical space, pixels in acoustic images correspond to the intensities of sound emanating within the defined physical space. In some cases, signal processing techniques in combination with a one-dimensional (1-D) array of microphones can be utilized, wherein each pixel of an output image represents the sound intensity from a unique angle of arrival as captured at each spatial point by microphones of the 1-D array. One such example technique is beamforming, also known as spatial filtering. Beamforming includes delaying each microphone signal relatively and adding them. As a result, the signal coming from a particular direction is amplified (e.g., is in phase) while signals coming from other directions (angles) are attenuated or otherwise mitigated. The intensity of the resulting signal can then be calculated and mapped such that a pixel corresponding to the angle (or direction) of arrival reflects the power of the signal.

BRIEF DESCRIPTION OF THE DRAWINGS

FIG. 1A illustrates an embodiment of a sound source localization apparatus.

FIG. 14 illustrates an embodiment of a second logic flow.

FIG. 15 illustrates an embodiment of a third logic flow.

FIG. 16 illustrates an embodiment of a fourth logic flow.

FIG. 18 illustrates an embodiment of a storage medium.

DETAILED DESCRIPTION

Figure 1B:
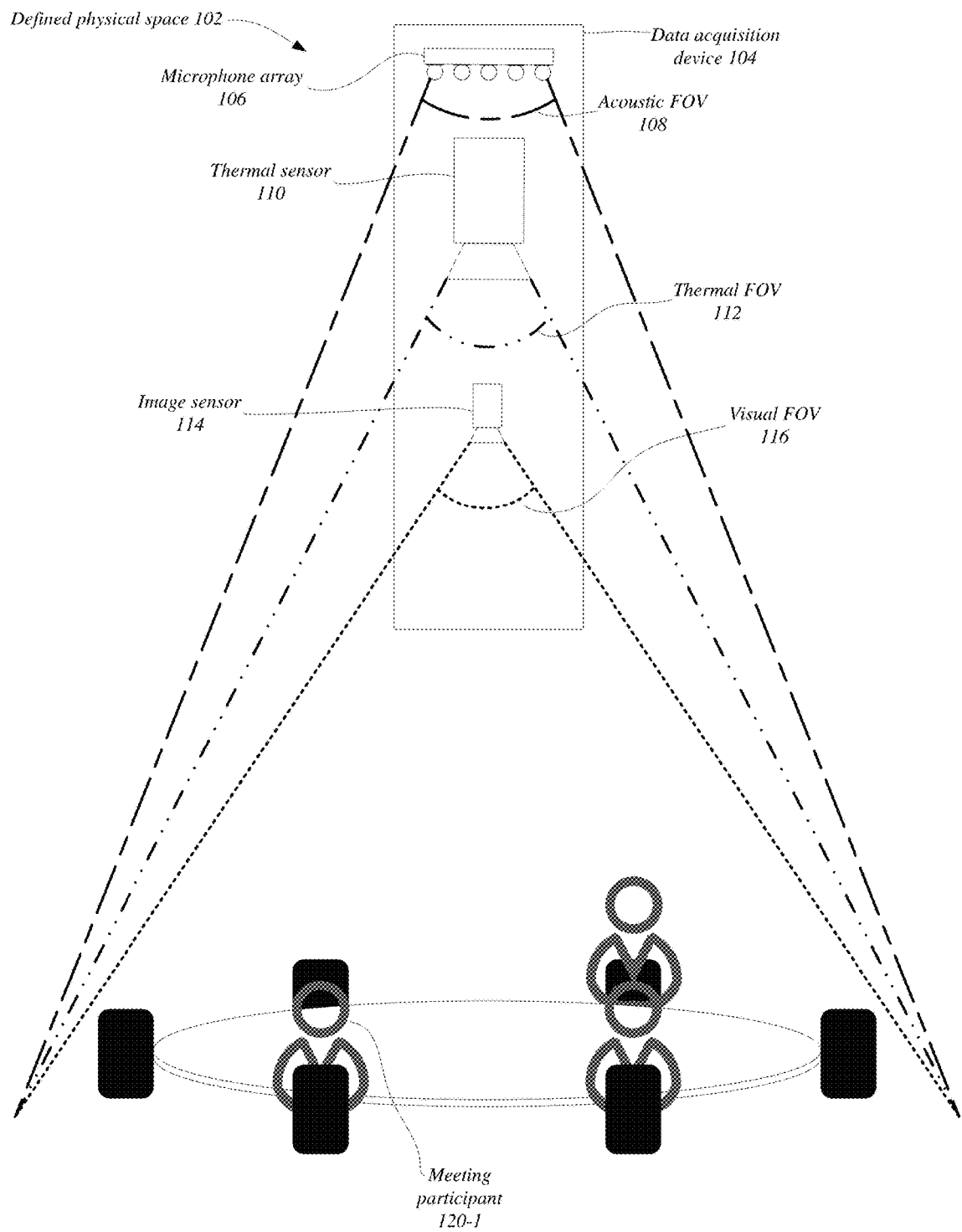
FIG. 1B illustrates an embodiment of a data acquisition device of the sound source apparatus.

Various embodiments are generally directed to sound source localization techniques. Some embodiments are particularly directed to sound source localization systems arranged to spatially analyze a defined physical space, such as a conference room or meeting hall, for example. Spatial analysis may be used to detect and classify sound and/or thermal objects within the defined physical space. For instance, spatial analysis can be implemented to improve detection of an active speaker in the defined physical space (e.g., during a meeting or lecture). Once the active speaker is identified, spatial filtering or beamforming may be applied to accurately capture audio originating from the active speaker.

One challenge facing sound source localization systems is the ability to quickly and efficiently identify an active speaker during an audio or video conference call. Sound propagating in an enclosed area such as a conference room can be difficult to localize. Sound propagation in an enclosed area depends heavily on the room layout, furniture layout, surface materials (e.g., wood, tile, carpet, etc.), interior decorations, and the like. The room geometry also plays a critical role in the way the sound waves interact with each other resulting in constructive and/or destructive interference. The type of surface sound waves encounter determines whether the sound is reflected or absorbed. Adding further complexity, the reflection and absorption of sound waves is not typically uniform across the whole audible bandwidth. All of these effects contribute to reverberations, which cause serious difficulties in identifying an active speaker from audio signals alone. Incorrect identification of an active speaker can compromise the quality and/or clarity of audio captured from the active speaker.

Conventional solutions attempt to solve the difficulties associated with identifying an active speaker by employing systems customized for a particular room, relying on complex signal processing algorithms, or requiring human operators. Human operators may increase cost and decrease efficiency of a sound source localization system. Signal processing algorithms may still be tricked by sound reverberations, causing such algorithms to be unreliable and resulting in low quality or even missed audio capture from an active speaker. Further, customized systems drastically reduce the flexibility of a sound source localization system. Such techniques may entail needless complexity, high costs, and poor efficiency.

To solve these and other problems, various embodiments include one or more additional modalities, other than acoustic, to localize an active speaker in order to improve the effectiveness of sound source localization systems. The alternate modality may entail the use of additional signals in combination with audio signals to quickly and efficiently spatially analyze a room to identify an active speaker.

In one embodiment, the alternate modality may entail the use of thermal signals in combination with audio signals to quickly and efficiently spatially analyze a room to identify an active speaker. For example, a microphone array may be augmented with a wide-angle thermal imaging camera to improve speaker localization. The wide-angle thermal imaging camera may identify and track various heat signatures, such as a heat signature for a human being. The heat signature for a human being is distinct from thermal signatures of other objects, such as laptops, televisions, and other heat generating appliances. Moreover, a thermal image is not distorted by the surrounding environment as readily as an acoustic image. Incorporating the thermal (e.g., far infrared) imaging capability in a sound source localization system can result in a more accurate, reliable, and robust system. Additionally, it can reduce the need for customization, making the system more applicable to a broader range of settings and implementations.

With general reference to notations and nomenclature used herein, portion of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1A illustrates one embodiment of a sound source localization apparatus 100. The sound source localization apparatus 100 may be used to capture audio from a defined physical space 102, such as a conference room, during a period of interest, such as a meeting or lecture. To capture audio from the defined physical space 102, the sound source localization apparatus 100 may use a data acquisition device 104 and an acoustic sound source localizer 122. In various embodiments, the data acquisition device and the sound source localizer 122 may interoperate to perform spatial analysis on the defined physical space 102 to improve the quality of audio recorded from the defined physical space 102 during the period of interest. In various such embodiments, spatial analysis of the defined physical space 102 may enable the sound source localization apparatus 100 to identify a location of interest in the defined physical space 102, such as one of the meeting participants 120, upon which to focus or localize the capture of audio. In some embodiment, localizing the capture of audio may be achieved with spatial filtering or beamforming.

The defined physical space 102 may represent any physical environment from which it is desired to capture audio during a period of interest. For example, the defined physical space 102 may comprise a conference room that includes a meeting table 118 surrounded by meeting participants 120. The data acquisition device 104 may be included in the defined physical space 102 to capture physical parameters of the defined physical space 102. These physical parameters may be used by the acoustic sound source localizer 122 to determine a location of interest within the defined physical space 102 on which to focus the capture of audio. In some embodiments, the location of interest can include a space occupied by a human being engaged in active speaking.

FIG. 1B illustrates an embodiment of a data acquisition device 104 of the sound source localization apparatus 100. The data acquisition device 104 may be used by the sound source localization apparatus 100 to capture audio from the defined physical space 102. The data acquisition device 104 may include various types of input devices or sensors (hereinafter collectively referred to as a "sensor"). As shown in FIG. 1B, the data acquisition device 104 comprises a microphone array 106, a thermal sensor 110, and an image sensor 114. In some cases, the sensors may be implemented separately, or combined into a sub-set of devices. In one embodiment, for example, the microphone array 106 and the image sensor 114 may be implemented as part of an acoustic camera. It may be appreciated that the data acquisition device 104 may include more or less sensors as desired for a given implementation. Embodiments are not limited in this context.

The microphone array 106 can have a plurality of independent microphones. The microphones may be arranged in a number of configurations in up to three dimensions. For example, the microphones in the microphone array may be arranged in a linear, grid, or spherical manner. Each microphone can encode a digital signal based on measured levels of acoustic energy. In various embodiments the microphone array may convert acoustic pressures from the defined physical space 102 to proportional electrical signals or audio signals for receipt by the acoustic sound source localizer 122. In various such embodiments the acoustic sound source localizer 122 may spatially analyze the defined physical space 102 based on the received signals. In one embodiment the microphone array 106 may include directional microphone array arranged to focus on a portion of the defined physical space 102.

The thermal sensor 110 may encode a digital signal based on measured intensities of thermal energy in the defined physical space 102. In some embodiments the thermal sensor 110 may convert heat from the defined physical space 102 to proportional electrical signals or thermal signals.

The image sensor 114 may encode a digital signal based on visual light detected within the defined physical space 102. In some embodiments the image sensor 114 may convert light from the defined physical space to proportional electrical signals or image signals.

In various embodiments, each sensor in the data acquisition device 104 may have a respective field of view (FOV) or capture domain. The FOV may cause the data acquisition device 104 to observe or capture a particular scene or image of the defined physical space 102. A scene or image of the defined physical space 102 may be represented by a state of the defined physical space 102 at a given moment in time. As shown in FIG. 1B, the microphone array 106 may have an acoustic FOV 108, the thermal sensor 110 may have a thermal FOV 112, and the image sensor 114 may have a visual FOV 116. The various embodiments, the FOVs 108, 112 and/or 116 may be separate, adjacent, adjoining or overlapping with each other. Embodiments are not limited in this context.

In various embodiments, each data acquisition device may have spatially aligned capture domains, as shown in FIG. 1B. In one embodiment, for example, one or more of the respective FOVs may overlap. Overlapping FOVs can improve identification of a location of interest by providing multiple modalities of spatial analysis with which to identify a point of interest within the defined physical space 102. For example, the microphone array 106 may determine an acoustic energy signal of a location of interest is originating from a location proximate meeting participant 120-1, and the thermal sensor 110 may determine a thermal energy signal of a human being is originating from a location proximate to meeting participant 120-1. By verifying that the location of origin of the acoustic energy signal and the thermal energy signal match, the speed and accuracy of finding a location of interest can be improved.

Figure 1C:
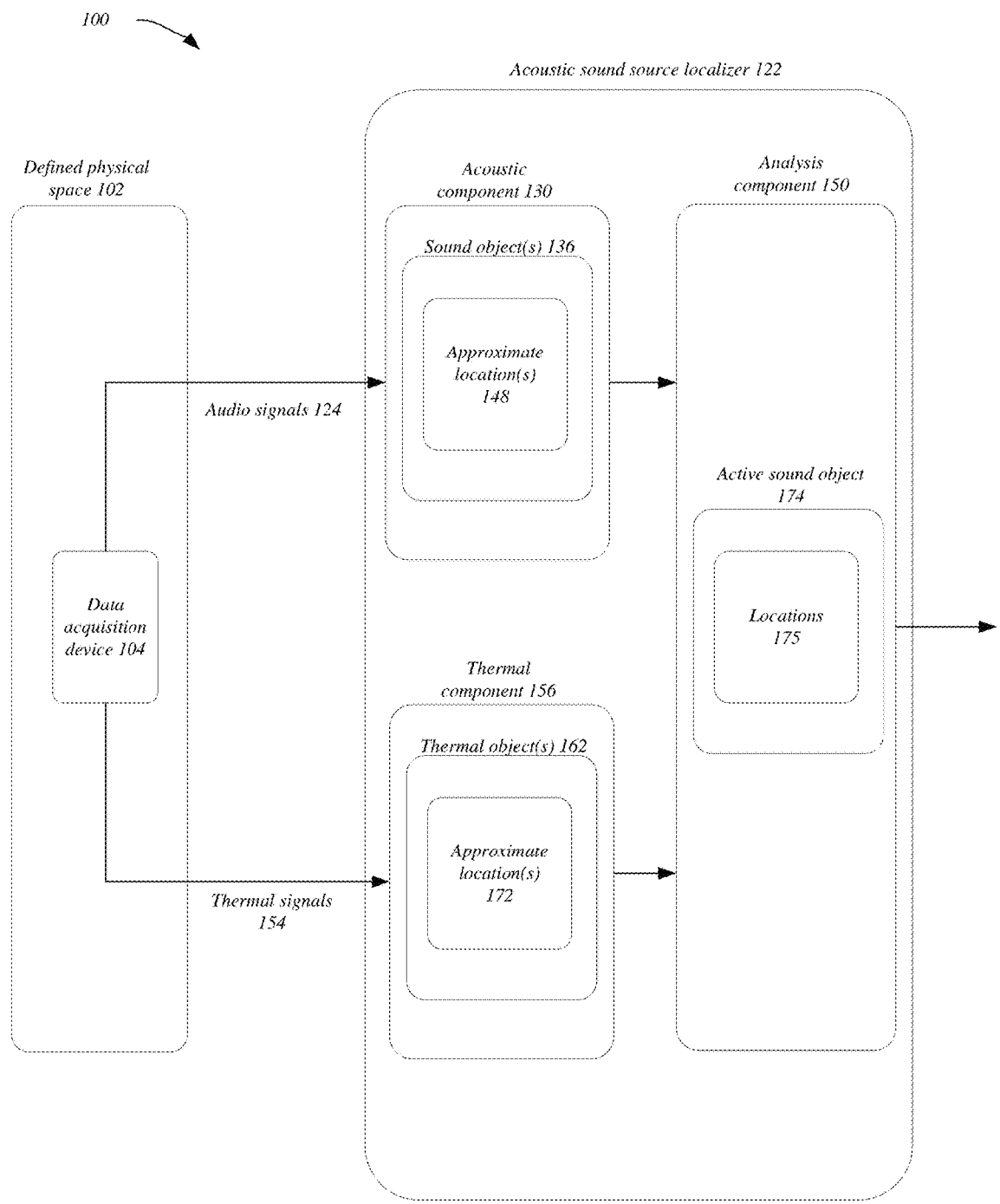
FIG. 1C illustrates an exemplary block diagram of a sound source localization apparatus.

FIG. 1C illustrates an embodiment of a sound source localization system 100. The sound source localization system 100 may include the data acquisition devices 104 and an acoustic sound source localizer 122. The acoustic sound source localizer may receive audio and thermal signals 124, 154 from one or more sensors of the data acquisition device 104. In various embodiments the received signals 124, 154 are analyzed by the acoustic sound source localizer 122 to identify a location of interest. The location of interest can comprise a location 175 of an active sound object 174. For example, the acoustic sound source localizer 122 may identify a location, such as an active speaker (e.g., meeting participant 120-1), based on signals detected, by the data acquisition device 104, in the defined physical space 102, such as a conference room, during a meeting. Embodiments are not limited in this context.

As shown in FIG. 1C, the acoustic sound source localizer 122 may include an acoustic component 110, a thermal component 156, and an analysis component 150. The acoustic component 110 may receive audio signals 124 and the thermal component 156 may receive thermal signals 154 detected in the defined physical space 102. From the received audio signals 124, the acoustic component 130 may determine one or more sound objects 136 and corresponding approximate locations 148 for each sound object 136. The thermal component 156 may determine one or more thermal objects 162 and corresponding approximate locations 172 for each thermal object 136 from the received thermal signals 154. In various embodiments, the sound and thermal objects 136, 162 may represent sound and/or heat generating objects within the defined physical space 102. In other words, sound objects 136 may include any object in the defined physical space that emits sound energy above ambient levels. Similarly, thermal objects 136 may include any object in the defined physical space 102 that emits thermal energy above ambient levels. In some embodiments, an object must meet a threshold value to be identified as a sound or thermal object 136, 162. In some embodiments, at least one of the sound objects 136 represents a human being. In some embodiments, at least one of the thermal objects 162 represents a human being. The approximate locations 148, 172 of the sound and thermal objects 136, 162 may then be passed to the analysis component 150 for identification of the active sound object 174, such as a human being engaged in active speaking.

The approximate locations 148, 172 may be compared by the analysis component 150 to identify the active sound object 174 and its location 175. In various embodiments, the location 175 of the active sound object 174 must correspond to an approximate location 148 of at least one sound object 136 that matches an approximate location 172 of at least one thermal object 172. In various such embodiments, the requirement of matching locations with regard to at least one thermal object 162 and at least one sound object 136 may provide an operation to verify the location 175 of the active sound object 174 is properly identified. The verification can improve the accuracy and reliability of the ability of the sound source localization apparatus 100 to identify the active sound object 174. In some embodiments matching sound and thermal object approximate locations 148, 172 may identify a location of a human being engaged in active speaking, such as meeting participant 120-1 of FIG. 1B, as the active sound object 174.

In various embodiments one or more portions of the sound source localization system 100, such as the acoustic component 130, the thermal component 156, and/or the analysis component 150, may be implemented in logic. In various such embodiments the logic may be implemented as part of a system-on-chip (SOC) and/or a mobile computing device. In an embodiment, the system 100 may be embodied in varying physical styles or form factors. For example, the system 100, or portions of it, may be implemented as a mobile computing device having wireless capabilities. A mobile computing device may refer to any device having a processing system and a mobile power source or supply, such as one or more batteries, for example. Some such examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 2:
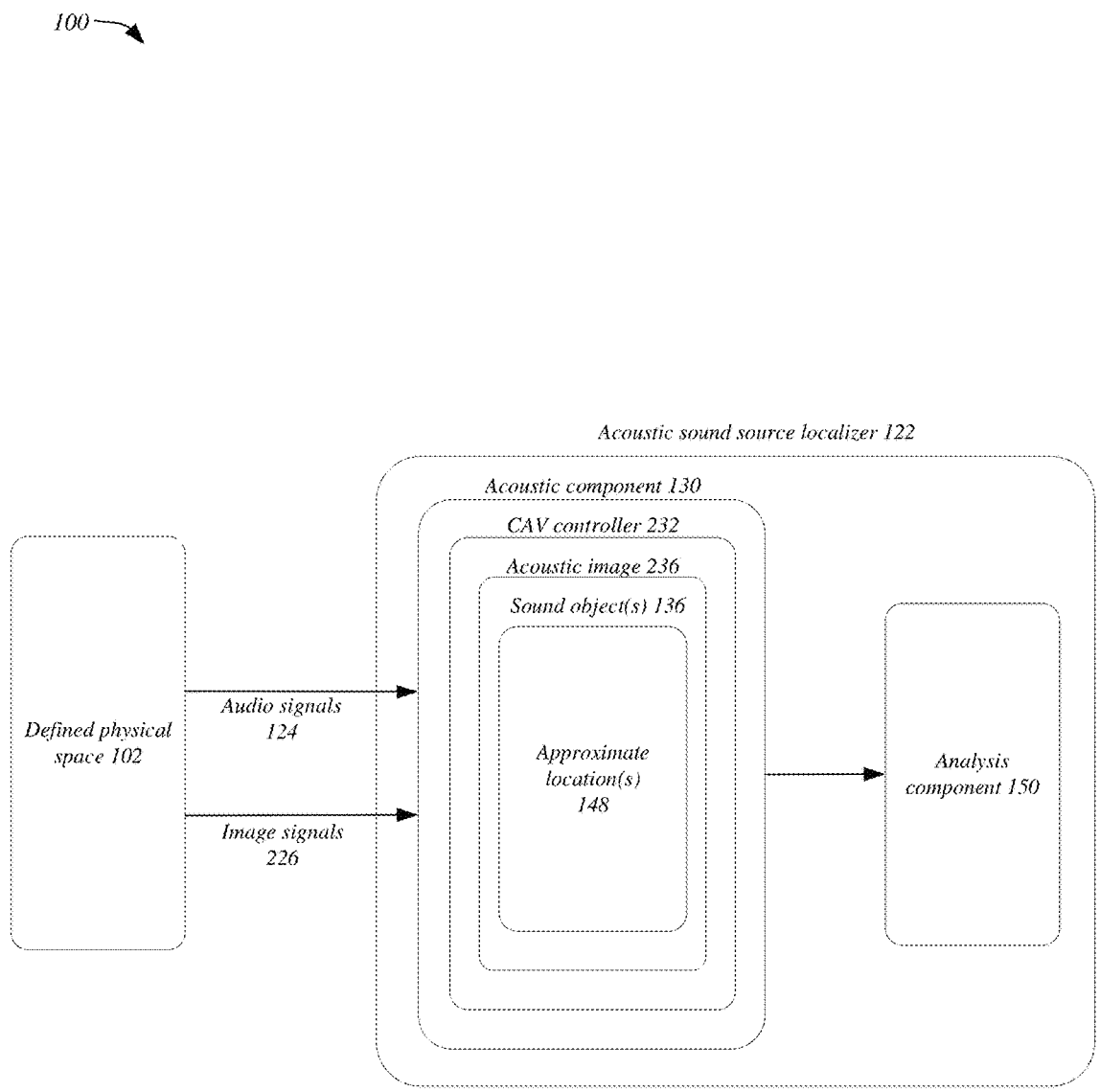
FIG. 2 illustrates an embodiment of an acoustic sound source localizer with a computer audio vision controller.

FIG. 2 illustrates an exemplary embodiment of a sound source localization system 100 with a computer audio vision (CAV) controller 232. The CAV controller 232 may be enable the sound source localization system 100 to generate an acoustic image 236 of a defined physical space 102, such as a conference room, based on audio and image signals 124, 226. The acoustic image 236 may be used in conjunction with the approximate locations 172 of thermal objects 162 to improve the accuracy of identifying active sound objects 174 by the analysis component 150. In the illustrated embodiment, the CAV controller 232 comprises a portion of acoustic component 130. In some embodiments the CAV controller 232 may comprise part of an acoustic camera. The embodiments are not limited in this context.

The acoustic image 236 may illustrate at least one sound object 136 and its corresponding approximate location 148. For instance, the acoustic image 236 may include a visual representation of sound energy detected by the data acquisition device 104 in a defined physical space 102. The visual representation of sound energy may be evaluated by the system 100 to identify approximate locations of sound objects 136 in defined physical space 102, such as a conference room. In various embodiments the acoustic image 236 may represent an image or scene of the defined physical space 102 at a given moment in time. In various such embodiments, the acoustic image 236 may be represented by a multi-dimensional set of pixels with each pixel representing a level of sound energy received from a unique portion of the defined physical space 102. When a sub-set of the pixels represents a relatively high level of sound energy (e.g. above ambient levels or above a threshold value), the unique portion of the defined physical space 102 it corresponds to may be identified in the acoustic image 236 as an approximate location 136 for a sound object. In some embodiments, the at least one sound object may be represented by a sub-set of pixels in the acoustic image 236.

Figure 3:
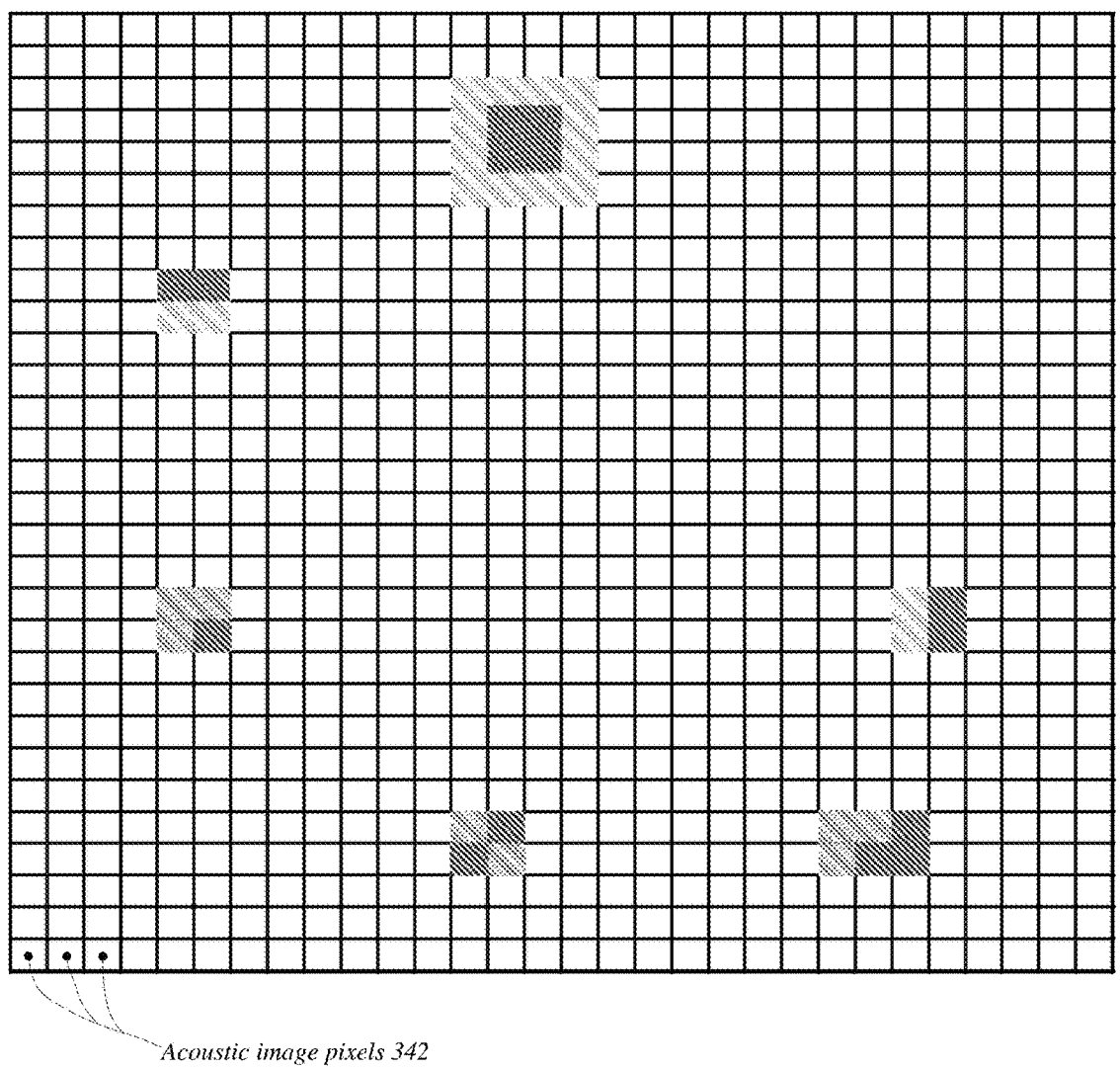
FIG. 3 illustrates an example of an acoustic image.

FIG. 3 illustrates one example of an acoustic image 236. The acoustic image may be represented as a two-dimensional grid of acoustic image pixels 342. To this end, pixel intensity of each pixel of a generated acoustic image 236 represents sound intensity from each unique angle of arrival of sound (azimuth and elevation). This may facilitate ready identification or labelling of an active sound object 174 or its corresponding location 175. Accordingly, the intensity or level of sound energy may be visually represented by the degree of shading of a respective acoustic image pixel. In the illustrated embodiment, a darker shading represents a higher level of sound energy arriving from the corresponding portion of the defined physical space 102. The embodiments are not limited in this context.

Figure 4:
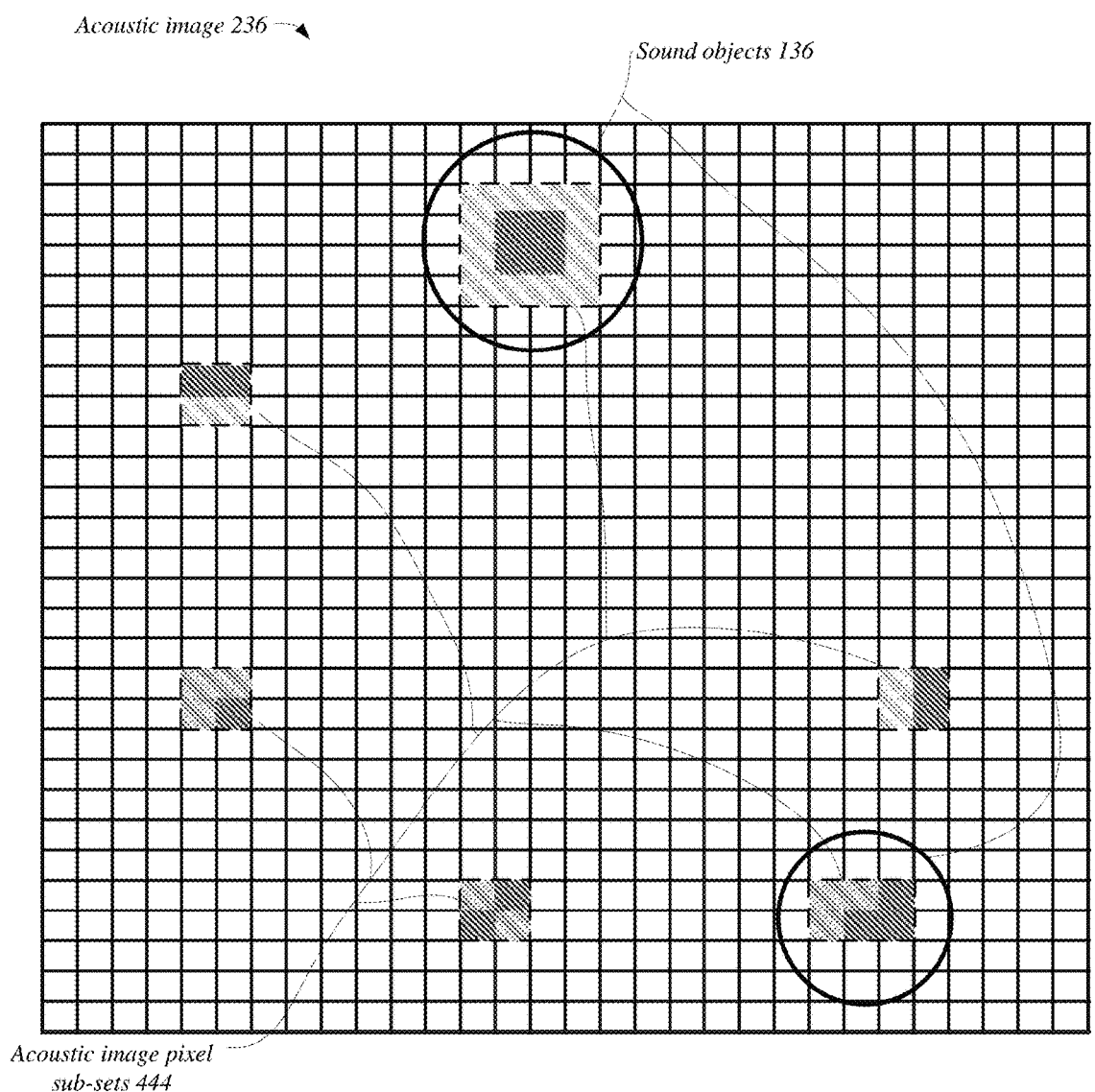
FIG. 4 illustrates an example of an acoustic image with sound objects.

FIG. 4 illustrates an example of an acoustic image 236 with sound objects 136. As previously described, the CAV controller 232 may generate acoustic image 236 to improve sound source localization. The pixels 342 of the acoustic image 236 may be evaluated by one or more components of the sound source localization system 100 such as the CAV controller 232 to identify sound objects 136 in a defined physical space 102 such as a conference room. In the illustrated embodiment, the pixels 342 are evaluated in acoustic image pixel sub-sets 444. The embodiments are not limited in this context.

In some embodiments acoustic image pixel sub-sets 444 may be selected for evaluation. Based on the evaluation, a sound energy value can be generated for each sub-set of pixels 444. The sound energy value can, in turn, be used to determine if a sub-set of pixels 444 should be labeled as a sound object 448. For example, whether the sound energy value satisfies a set of one or more conditions can determine when a sub-set of pixels 444 is identified as sound object 136. The set of one or more conditions may include parameters such as minimum and/or maximum sound energy values. In some embodiments the set of one or more conditions may include a threshold sound energy value that must be met or exceeded for the respective sub-set of pixels 444 to be identified as a sound object 136.

Figure 5:
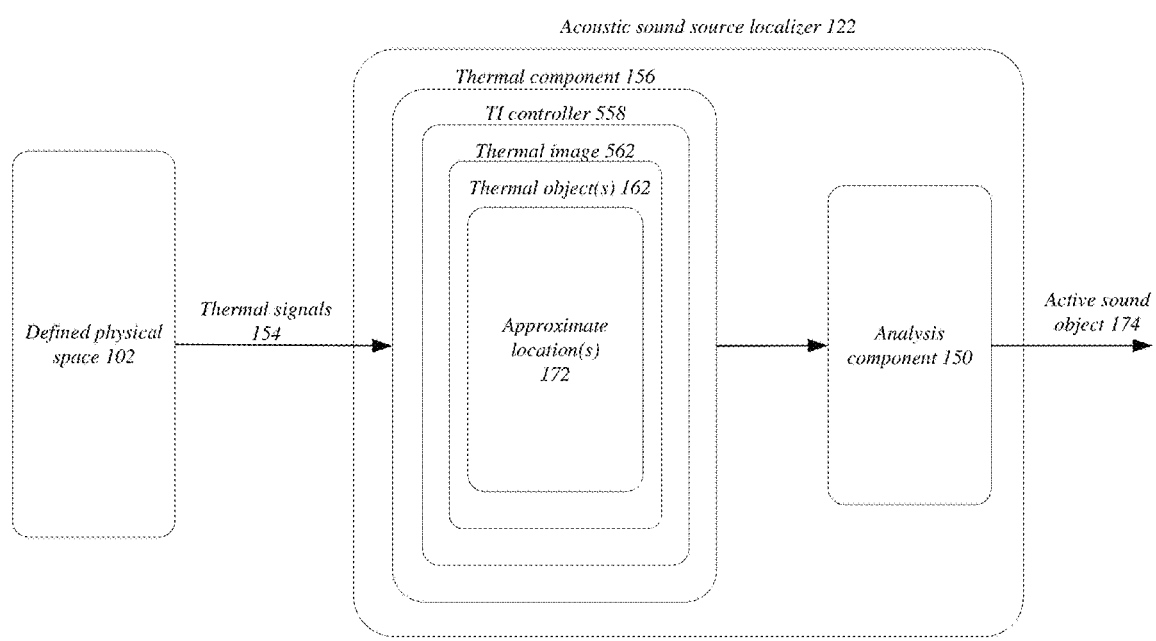
FIG. 5 illustrates an embodiment of an acoustic sound source localizer with a thermal image controller.

FIG. 5 illustrates an exemplary embodiment of a sound source localization system 100 with a thermal image (TI) controller 558. The TI controller 558 may be enable the sound source localization system 100 to generate a thermal image 562 of a defined physical space 102, such as a conference room, based on thermal signals 154. The thermal image 562 may be used in conjunction with the acoustic image 236 to improve accurate identification of the active sound object 174 by the analysis component 150, as will be described below with reference to FIGS. 8-9. In the illustrated embodiment, the TI controller 558 forms a portion of thermal component 156. In some embodiments the TI controller 558 may comprise part of a thermal camera. The embodiments are not limited in this context.

The thermal image 562 may depict at least one thermal object 162 and its corresponding approximate location 172. For instance, the thermal image 562 may include a visual representation of thermal energy detected by the data acquisition device 104 in a defined physical space 102. The visual representation of thermal energy may be evaluated by the system 100 to identify approximate locations of thermal objects 162 in defined physical space 102, such as a conference room. In various embodiments the thermal image 562 may represent an image or scene of the defined physical space 102 at a given moment in time. In various such embodiments, the thermal image 562 may be represented by a multi-dimensional set of pixels with each pixel representing a level of sound energy received from a unique portion of the defined physical space 102. When a sub-set of the pixels represents a relatively high level of thermal energy (e.g. above ambient levels or above a threshold value), the unique portion of the defined physical space 102 it corresponds to may be identified in the thermal image 562 as an approximate location 172 for a thermal object 162. In some embodiments, the at least one sound object may be represented by a sub-set of pixels in the thermal image 562.

Figure 6:
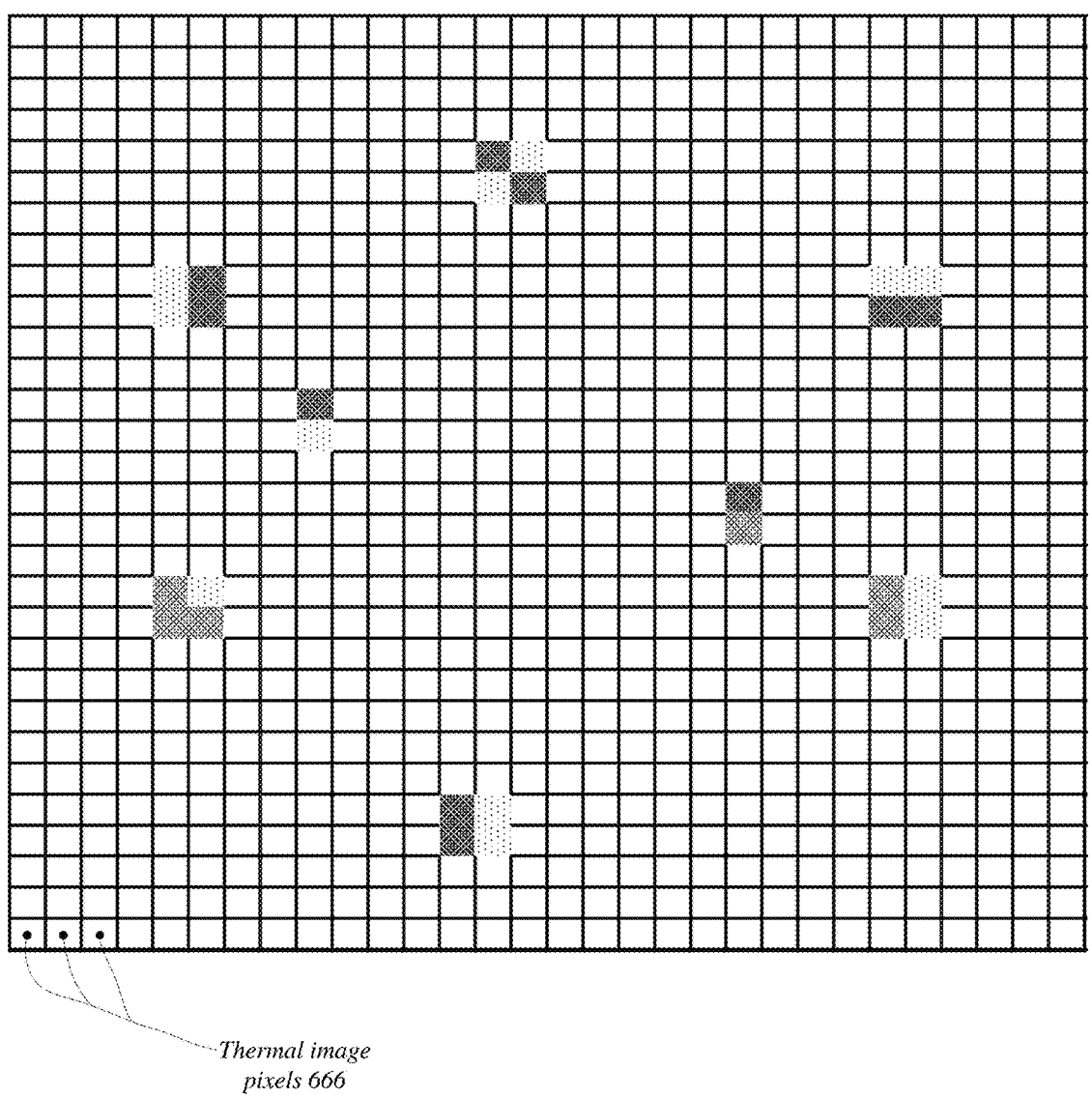
FIG. 6 illustrates an example of a thermal image.

FIG. 6 illustrates one example of a thermal image 562. The thermal image 562 may be represented as a two-dimensional grid of thermal image pixels 666. To this end, pixel intensity of each pixel of a generated thermal image 562 represents thermal energy intensity from each unique angle of arrival of thermal energy (azimuth and elevation). This may facilitate ready identification or labelling of an active sound object 174. Accordingly, the intensity or level of thermal energy may be visually represented by the degree of shading of a respective thermal image pixel 666. In the illustrated embodiment, a darker shading represents a higher level of thermal energy arriving from the corresponding portion of the defined physical space 102. The embodiments are not limited in this context.

Figure 7:
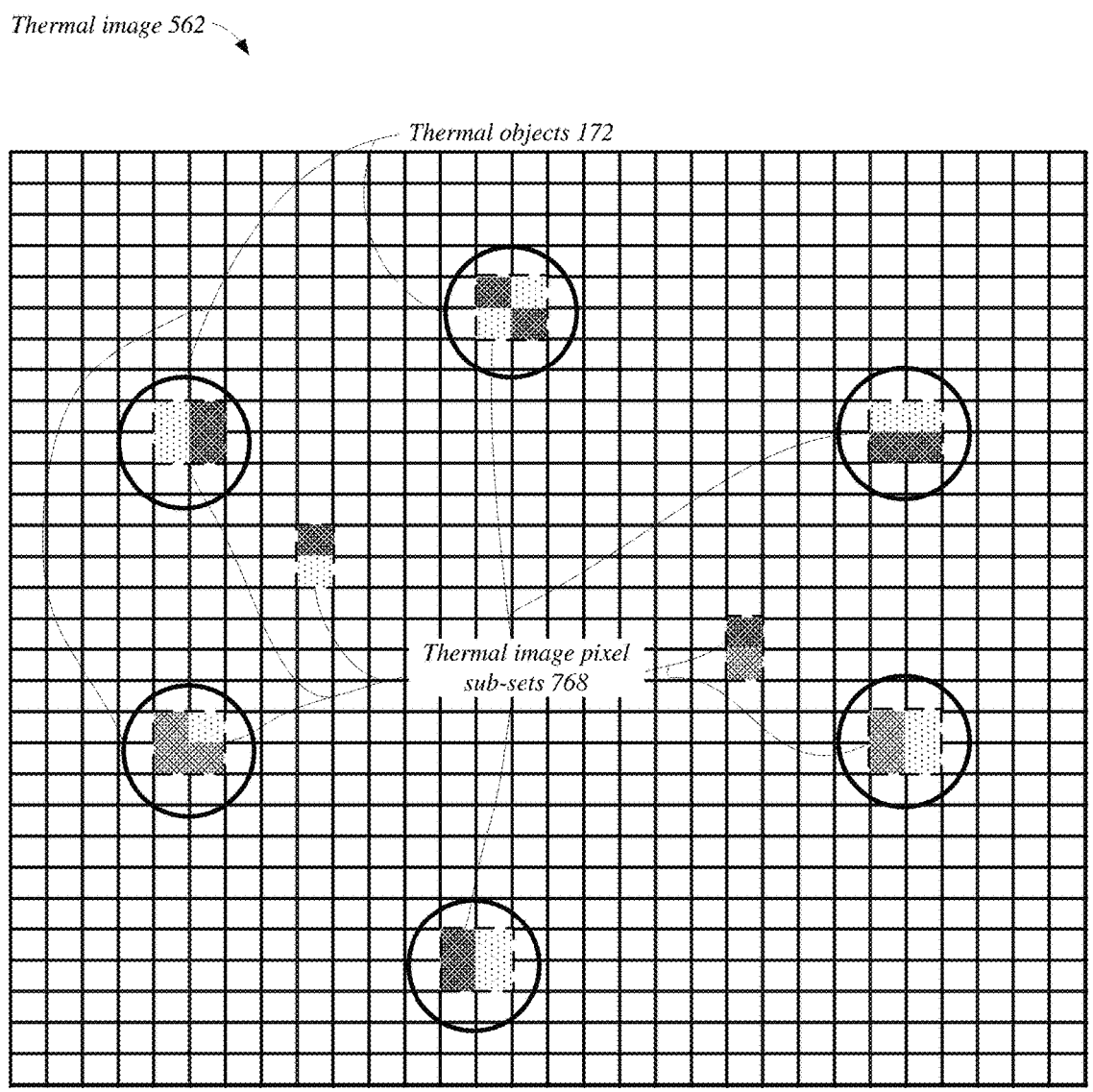
FIG. 7 illustrates an example of a thermal image with thermal objects.

FIG. 7 illustrates an example of a thermal image 562 with thermal objects 172. As previously described, the TI controller 558 may generate thermal image 562. The thermal image 562 may be evaluated by one or more components of the sound source localization system 100. In the illustrated embodiment, the thermal image 562 can be evaluated by the TI controller 558. The embodiments are not limited in this context.

As part of the evaluation, thermal image pixel sub-sets 768 may be selected. A thermal energy value can be generated for each sub-set of pixels 768. Based on the thermal energy value, a sub-set of pixels 768 may be labeled as a thermal object 172. Whether the thermal energy value satisfies a set of one or more conditions can determine when a sub-set of pixels 768 may be identified as a thermal object 172. The set of one or more conditions may include parameters such as minimum and/or maximum thermal energy values. In various embodiments the set of one or more conditions may include a threshold thermal energy value that must be met or exceeded for the respective sub-set of pixels 768 to be identified as a thermal object 172. In various such embodiments the threshold thermal energy value may represent a heat signature for a human being. In other embodiments the threshold thermal energy value can represent a heat signature for a non-human object. In other such embodiments when the thermal energy value for a sub-set of pixels 768 is lesser than or equal to a threshold thermal energy value, the sub-set of pixels 768 is not identified as a thermal object 772. The embodiments are not limited in this context.

Figure 8:
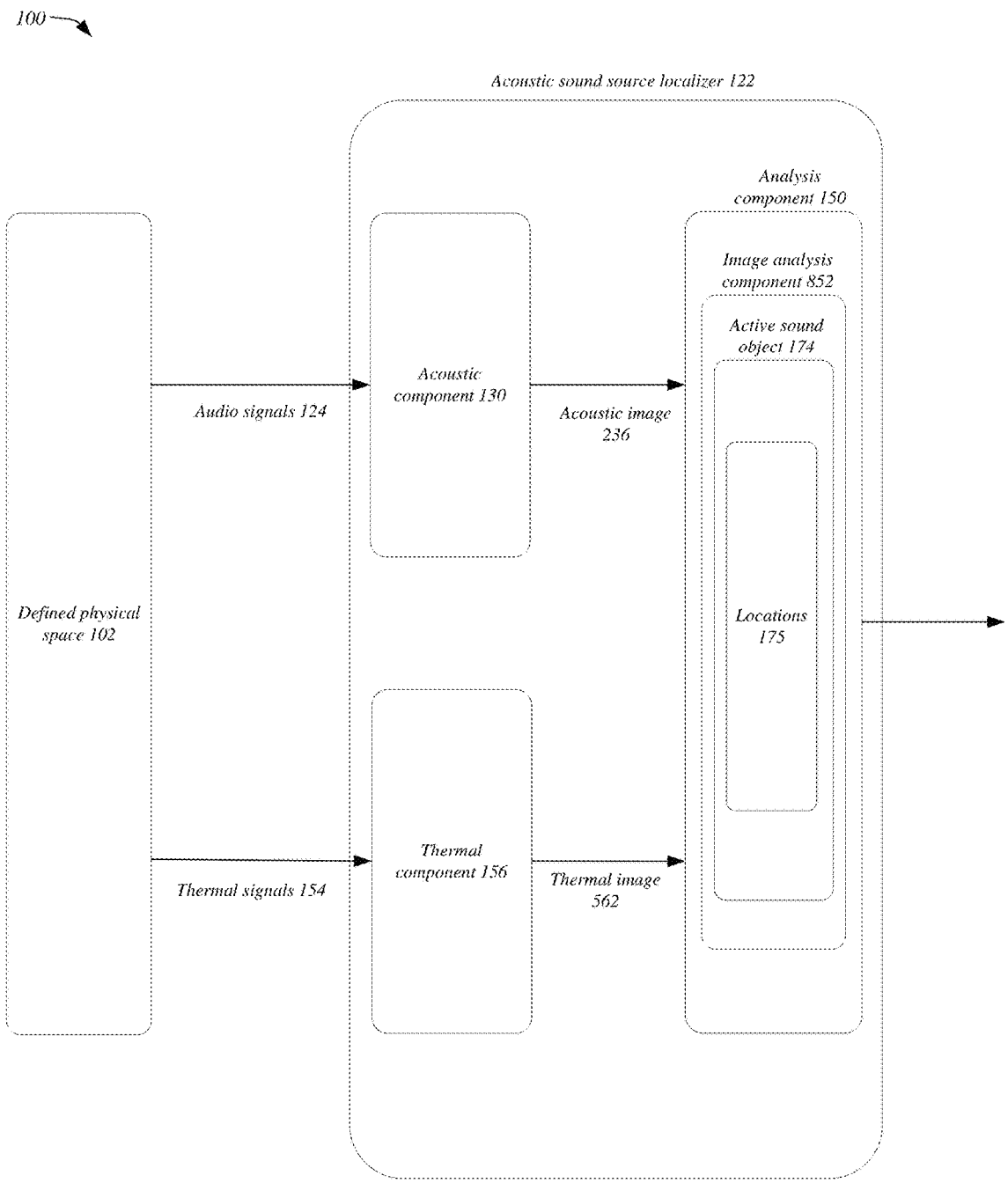
FIG. 8 illustrates an embodiment of an acoustic sound source localizer with an image analysis component.

FIG. 8 illustrates an embodiment of an acoustic sound source localizer 122 with an image analysis component 852. The image analysis component 852 may identify an active sound object 174 in the defined physical space 102 by using an acoustic image 236 and a thermal image 562. In some embodiments the acoustic and thermal images 236, 562 are spatially and temporally aligned. The active sound object location 174 may be identified by the image analysis component 852 based on a comparison of the acoustic and thermal images 236, 562. In the illustrated embodiment, the image analysis component 852 can be included in the analysis component 150. The embodiments are not limited in this context.

As previously described, the analysis component 150 may receive an acoustic image 236 generated by an acoustic component 130, such as the CAV controller 232, based on audio signals 124 and/or image signals 226 received from the defined physical space 102. Further the analysis component 150 may receive a thermal image 562 generated by a thermal component 156, such as TI controller 558 based on thermal signals 154 received from the defined physical space 102.

The image analysis component may evaluate the acoustic image 236 and the thermal image 562 to identify the active sound object 174 and its location 175. In various embodiments the acoustic image 236 and the thermal image 562 may be evaluated by creating an acoustic/thermal image overlay 976. In various such embodiments the image analysis component may spatially and temporally align two images 236, 562 to create the acoustic/thermal image overlay 976. In some embodiments the image analysis component 852 may execute various post-processing routines to perform spatial and temporal alignments. Note that spatial and temporal alignments may be performed by one or more other components of the sound source localization system 100. For instance, the data acquisition device 104 may include hardware, software, or any combination thereof to spatially and/or temporally align the acoustic and thermal images 236, 562.

Figure 9:
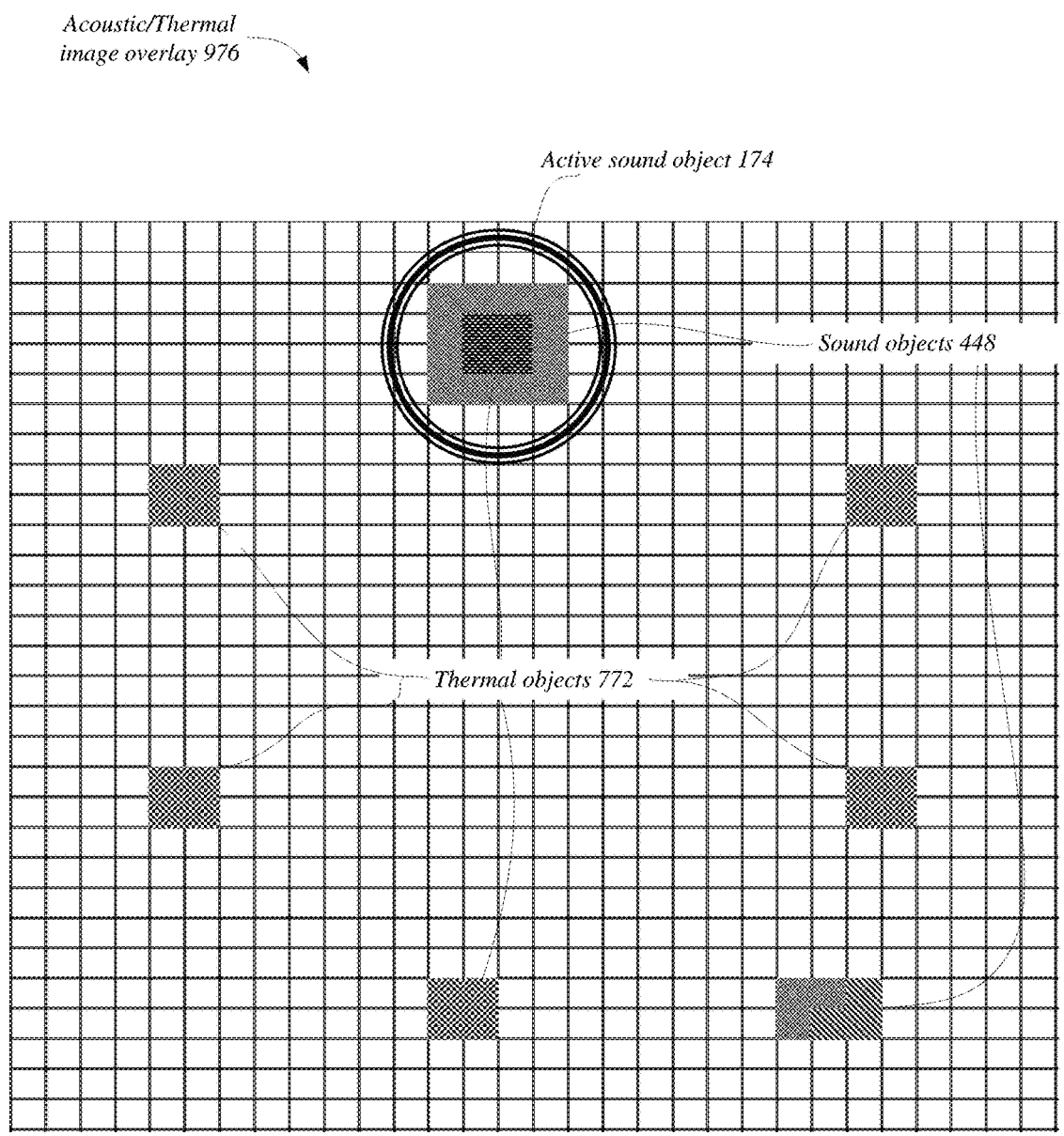
FIG. 9 illustrates an example of an acoustic/thermal image overlay.

FIG. 9 illustrates one example of an acoustic/thermal image overlay 976. The acoustic/thermal image overlay 976 may comprise a composite of the acoustic image 236 and the thermal image 562. The acoustic/thermal image overlay 976 may include sound objects 448 and thermal objects 772. The relative locations or positions of the sound and thermal objects 448, 772 may be compared to identify the active sound object 174. For instance, when the locations of a sound object 448 and a thermal object 772 are matching or approximately the same, that location can be identified for the active sound object 174. The embodiments are not limited in this context.

In some embodiments the acoustic image 236 and the thermal image 562 may include the same number and correlation of pixels. This may assist with spatial alignment of the images 236, 562 by providing a one-to-one relationship between acoustic image pixels 342 and thermal image pixels 666. The one-to-one relationship between image pixels 342, 666 can allow one of the images 236, 562 to be superimposed on top of the other image, resulting in creation of the acoustic/thermal image overlay 976.

Figure 10:
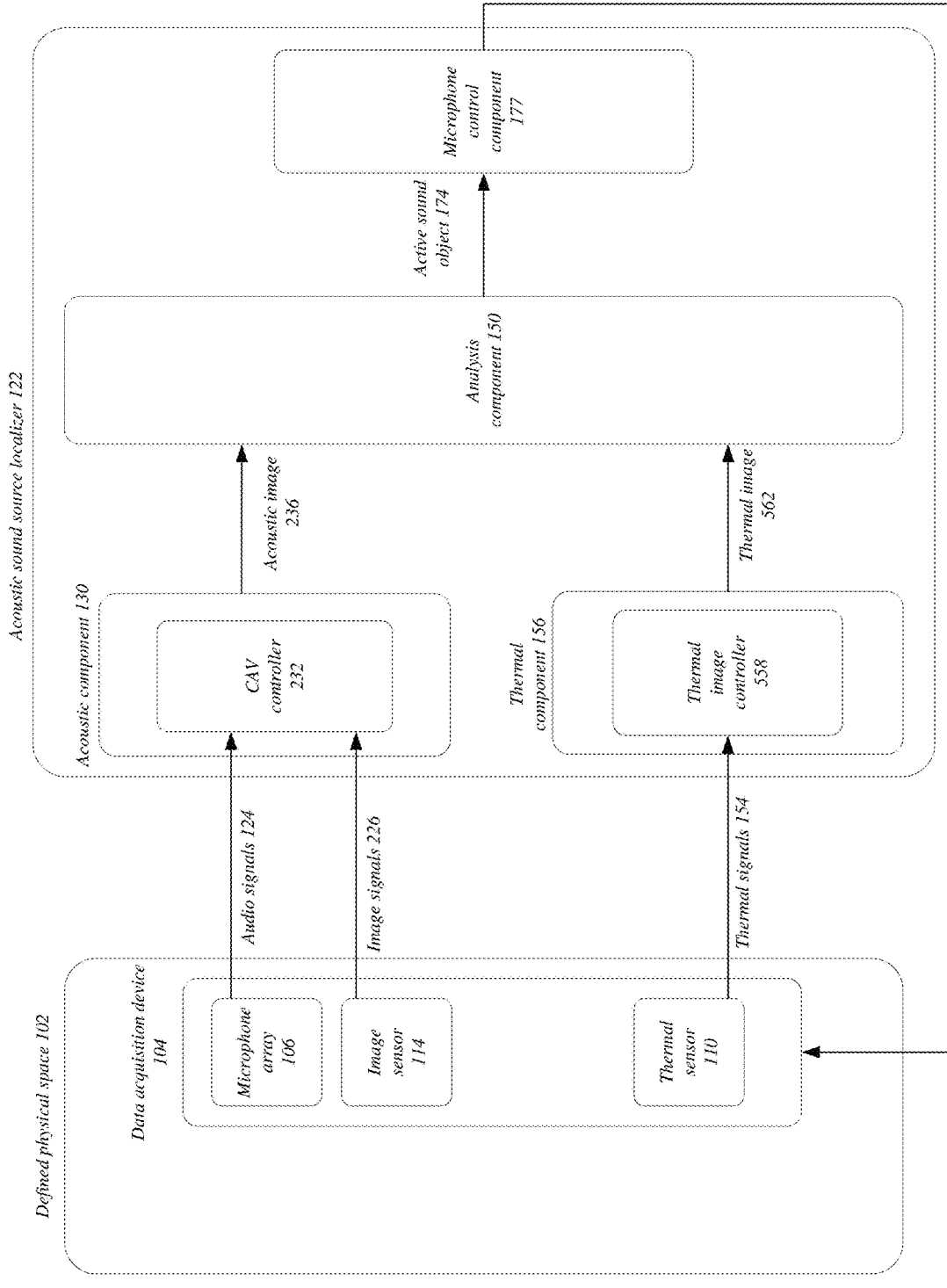
FIG. 10 illustrates an embodiment of a sound source localization system with a data acquisition device.

FIG. 10 illustrates an embodiment of a sound source localization system 100 communicatively coupled to a data acquisition device 104. The data acquisition device 104 may be located in a defined physical space 102. As described above, the data acquisition device 104 may include sensors such as microphone array 106, image sensor 114, and/or thermal sensor 110. The data acquisition device 104 may be used to capture physical parameters of the defined physical space 102. These physical parameters may include light, acoustic, or thermal energy. The physical parameters may be converted into audio, image, and thermal signals 124, 226, 154 by the data acquisition device 104 to enable spatial analysis of the defined physical space 102. The embodiments are not limited in this context.

The microphone array 106 may have one or more microphone devices. The one or more microphone device can include a unidirectional microphone type, a bi-directional microphone type, a shotgun microphone type, a contact microphone type, a parabolic microphone type or the like. The microphone array 106 can be implemented as, for example, any number of microphones devices that can convert sound (e.g., acoustic pressures) into a proportional electrical signal (e.g., audio signals 124). In the general context of the techniques discussed herein, the microphone array 106 is a 2-D microphone array having an M×N pattern of microphone devices, but other microphone array configurations will be apparent in light of this disclosure. One such example 2-D microphone array with an 8×8 microphone array of a uniform linear array pattern. Each microphone is positioned in a particular row and column and thus can be addressed individually within the array of microphones. It should be appreciated that in other embodiments, the microphone array could be configured in different patterns such as, for example, circular, spiral, random, or other array patterns. Note that in the context of distributed acoustic monitoring systems, the array of microphones 106 may comprise a plurality of microphone arrays that are local or remote (or both local and remote) to the system 100. The embodiments are not limited in this context.

Each microphone of microphone array 106 can be implemented as, for example, a microphone device with an omnidirectional pickup response such that response is equal to sounds coming from any direction. In an embodiment the omnidirectional microphones can be configured to be more sensitive to sounds coming from a source perpendicular to the broadside of microphone array 106. Such a broadside array configuration is particularly well-suited for targeting sound sources in front of the microphone array 106 versus sounds originating from, for instance, behind the microphone array 106. Other suitable microphone arrays can be utilized depending on the application, as will be apparent in light of this disclosure. For example, end-fire arrays may be utilized in applications that require compact designs, or those applications that require high gain and sharp directivity. In other embodiments, each microphone can comprise a bi-directional, unidirectional, shotgun, contact, or parabolic style microphone. As generally referred to herein, a contact microphone can enable detecting sound by having the microphone in contact or close proximity with an object (e.g., a machine, a human). For example, a contact microphone could be put in contact with the outside of a device (e.g., a chassis) where it may not be possible or otherwise feasible to have a line of sight with the target device or object to be monitored.

As shown in the example microphone array 106, each microphone is comprised of identical microphone devices. One such specific example includes MEMS-type microphone devices. In other embodiments, other types of microphone devices may be implemented based on, for example, form factor, sensitivity, frequency response and other application-specific factors. In a general sense, identical microphone devices are particularly advantageous because each microphone device can have matching sensitivity and frequency response to insure optimal performance during audio capture, spatial analysis, and spatial filtering (i.e. beamforming). In an embodiment, microphone array 106 can be implemented within a housing or other appropriate enclosure. In some cases, the microphone array 200 can be mounted in various ways including, for instance, wall mounted, ceiling mounted and tri-pod mounted. In addition, the microphone array 106 can be a hand-held apparatus or otherwise mobile (non-fixed). In some cases, each microphone can be configured to generate an analog or digital data stream (which may or may not involve Analog-to-Digital conversion or Digital-to-Analog conversion).

It should be appreciated in light of this disclosure that other types of microphone devices could be utilized and this disclosure is not limited to a specific model, or use of a single type of microphone device. For instance, in some cases it may be advantageous to have a subset of microphone devices with a flat frequency response and others having a custom or otherwise targeted frequency response. Some such examples of a targeted frequency response include, for instance, a response pattern designed to emphasize the frequencies in a human voice while mitigating low-frequency background noise. Other such examples could include, for instance, a response pattern designed to emphasize high or low frequency sounds including frequencies that would normally be inaudible or otherwise undetectable by a human ear. Further examples include a subset of the microphone array 106 having a response pattern configured with a wide frequency response and another subset having a narrow frequency response (e.g., targeted or otherwise tailored frequency response). In any such cases, and in accordance with an embodiment, a subset of the microphone array 106 can be configured for the targeted frequency response while the remaining microphones can be configured with different frequency responses and sensitivities.

As shown, data acquisition device 104 may include an image sensor 114. Image sensor 114 may be implemented as any type of sensor capable of capturing light and converting it into a proportional electrical signal including, for example, CMOS, CCD and hybrid CCD/CMOS sensors. Some such example sensors include, for instance, color image data (RGB), color and depth image data (RGBD camera), depth sensor, or stereo camera (L/R RGB). Although a single image sensor 104 is depicted in FIG. 1A, it should be appreciated additional sensors and sensor types can be utilized (e.g., multiple cameras arranged to photograph a scene of a defined physical space from different perspectives) without departing from the scope of the present disclosure. To this end, image sensor 114 can be implemented as a number of different sensors depending on a particular application. For example, image sensor 114 may include a first sensor being a depth sensor detector, and a second sensor being a color-image sensor (e.g., RGB, YUV). In other examples, image sensor 104 may include a first sensor configured for capturing an image signal (e.g., color image sensor, depth-enabled image sensing (RGDB), stereo camera (L/R RGB), or YUV) and a second sensor configured to capture image data different from the first image sensor. The embodiments are not limited in this context.

The data acquisition device 104 may include a thermal sensor 110. Thermal sensor 110 may be implemented as any type of sensor capable of detecting thermal energy and converting it into proportional electrical signals including, for example CMOS, CCD and hybrid CCD/CMOS sensors. Some such example sensors include, for instance, infrared signals, x-rays, ultra-violet signals, and the like. Although a single thermal sensor 110 is depicted in FIG. 10, it should be appreciated additional sensors and sensor types can be utilized (e.g. multiple thermal cameras arranged to image a scene of a defined physical space from different perspectives) without departing from the scope of the present disclosure. To this end, thermal sensor 110 can be implemented as a number of different sensors depending on a particular application. For example, thermal sensor 110 may include a stereo thermal camera. The embodiments are not limited in this context.

Referring again to FIG. 10, acoustic images 236 and thermal images 562 can be generated by the acoustic component 130 and the thermal component 156, 154 respectively, based on signals 124, 226, 154 received by the acoustic sound source localizer 122 from the data acquisition device 104. These images 236, 562 may be received by the analysis component 150 in order to identify the location of the active sound object 174 in the defined physical space 102. The embodiments are not limited in this context.

In the illustrated embodiment, the acoustic sound source localizer 122 includes a microphone control component 177. The microphone control component 177 may receive the active sound object location 174 from the analysis component 150 after spatial analysis of the defined physical space 102 has been performed. In some embodiments, based on the location of the active sound object 174, the microphone control component 177 may send control directives to the data acquisition device 104 to spatially filter the active sound object by steering an acoustic beam towards the location of the active sound object 174. Thus, the microphone control component 177 may be communicatively coupled to the data acquisition device 104. This can create a logical loop that identifies an active sound object 174, spatially filters the active sound object 174, and then repeats. An embodiment of this logical loop will be explained in more detail with respect to FIG. 11.

Figure 11:
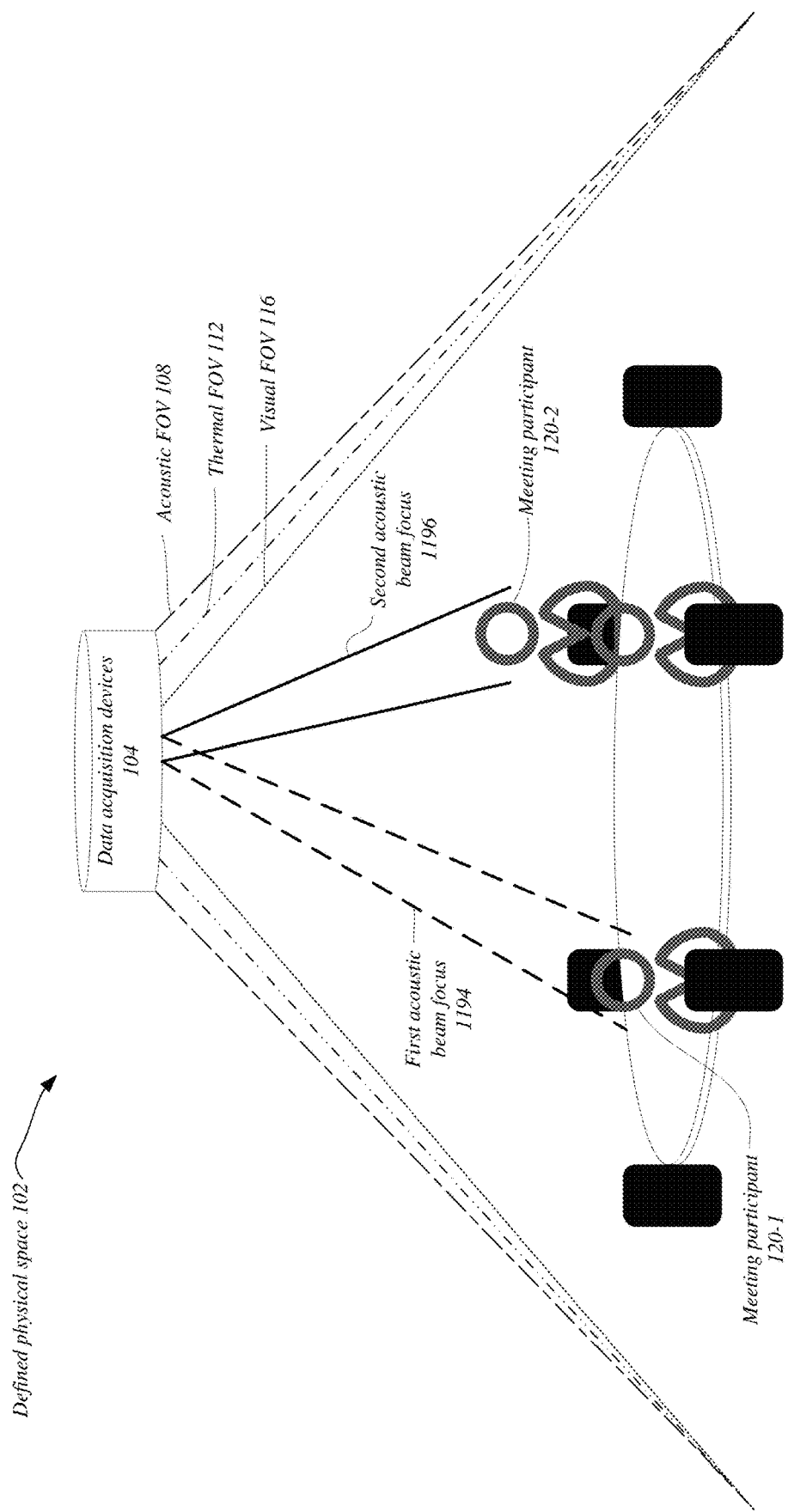
FIG. 11 illustrates an embodiment of spatial analysis and spatial filtering.

FIG. 11 illustrates an embodiment of spatial analysis and spatial filtering by the sound source localization apparatus 100. In this example, a meeting may be occurring in a defined physical space 102 that is a conference room. During the meeting, a plurality of images or scenes of the defined physical space 102 may be captured by the overlapping acoustic FOV 108, thermal FOV, 112, and visual FOV 116 of data acquisition device 104. Each of the images may be analyzed by the sound source localization system 100 to identify active sound objects 174.

For instance, during a first period of time, meeting participant 120-1 may be engaged in active speech, such as providing an overview of the meeting content as other meeting participants 120-2, 120-3 listen. Because meeting participant 120-1 is engaged in active speech, the participant 120-1 is identified as a sound object 136. Because meeting participants 120-1, 120-2, 120-3 all have thermal signatures matching a human being, each of the participants 120-1, 120-2, 120-3 are identified as thermal objects 162. However, because only meeting participant 120-1, during the first period of time, was identified as both a sound object 136 and a thermal object 162, meeting participant 120-1 is identified as the active sound object 174 by the sound source localization system 100. As a result, the microphone control component 177 directs the data acquisition device 104 (e.g. microphone array 106) to spatially filter the defined physical space 102 by acquiring a first acoustic beam focus 1194 on meeting participant 120-1 during the first time period.

Subsequently, meeting participant 120-1 may cease to be engaged in active speech and meeting participant 120-2 may begin actively speaking during a second period of time. For instance, meeting participant 120-1 may conclude the overview and meeting participant 120-2 may begin talking about a first topic. Because meeting participant 120-1 is no longer engaged in active speech, participant 120-1 is not identified as a sound object 136 during the second period of time. However, as meeting participant 120-2 is engaged in active speech during the second period of time, participant 120-2 is identified as a sound object 136. Because meeting participants 120-1, 120-2, 120-3 all continue to have thermal signatures matching a human being, each of the participants 120-1, 120-2, 120-3 are again identified as thermal objects 162 during the second period of time. As meeting participant 120-2 is the only object in the defined physical space 102, during the second period of time, which is identified as both a sound object 136 and a thermal object 162, participant 120-2 is identified as the active sound object 174 during the second period of time. As a result, the microphone control component 177 directs the data acquisition device 104 (e.g. microphone array 106) to spatially filter the defined physical space 102 by acquiring a second acoustic beam focus 1196 on meeting participant 120-2 during the second time period. As may be appreciated, this process may be repeated at a selectable frequency (e.g., 0.5 Hz, 1 Hz, 10 Hz,) throughout the course of the meeting, enabling the sound source localization system 100 to continually maintain an acoustic beam focus on the active sound object 174.

Figure 12A:
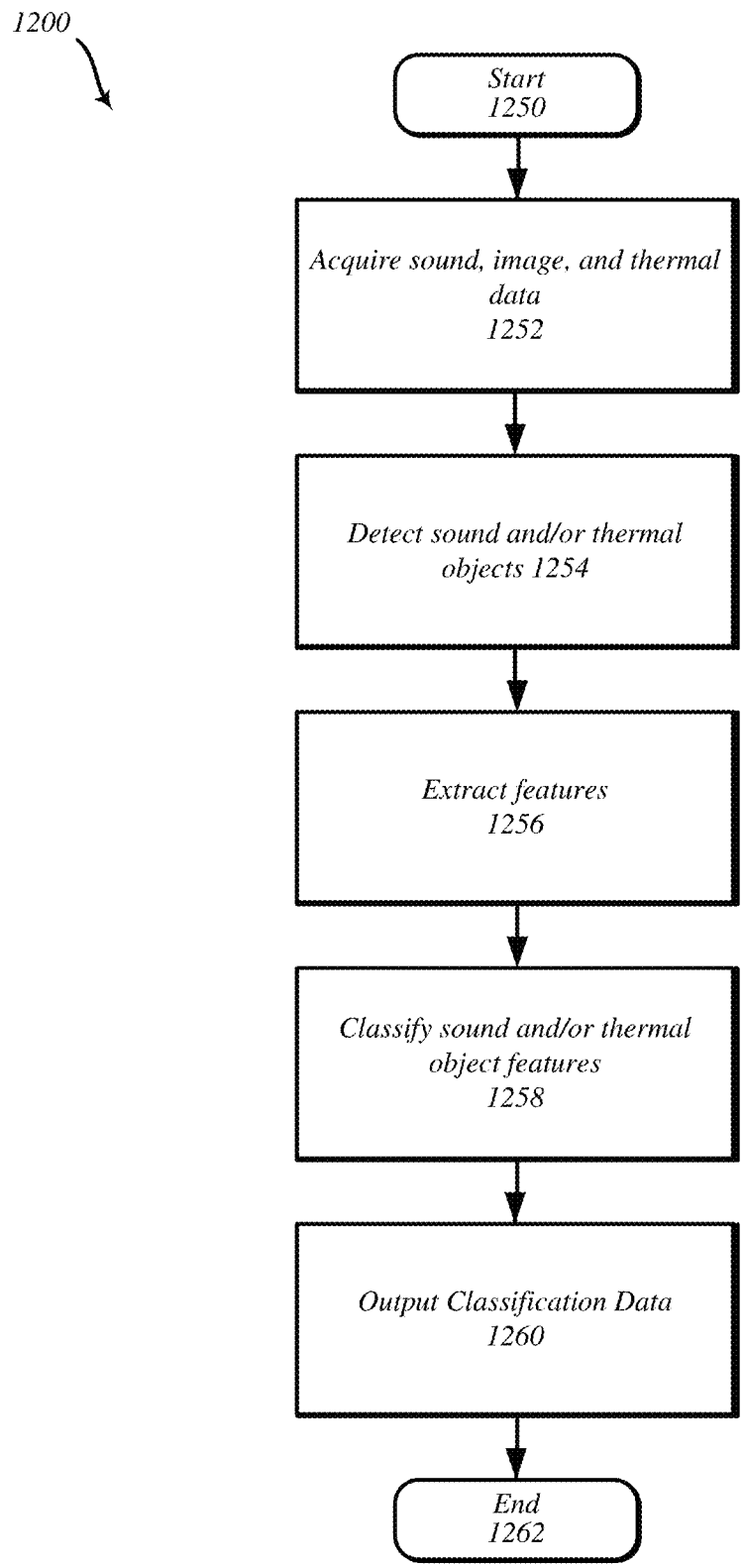
FIG. 12A illustrates an example methodology for analysis of a defined physical space using acoustic and thermal imaging.

FIG. 12A illustrates an example methodology 1200 for spatially analyzing a defined physical space 102 and/or spatially filtering an active sound object 174 such as a human being engaged in active speech. For instance, acoustic and thermal may be used to detect and classify sound and/or thermal objects within the defined physical space 102, in accordance with an embodiment of the present disclosure. This methodology may be implemented, for example, by the sound source localization apparatus 100, although numerous embodiments will be apparent in light of this disclosure.

Figure 12B:
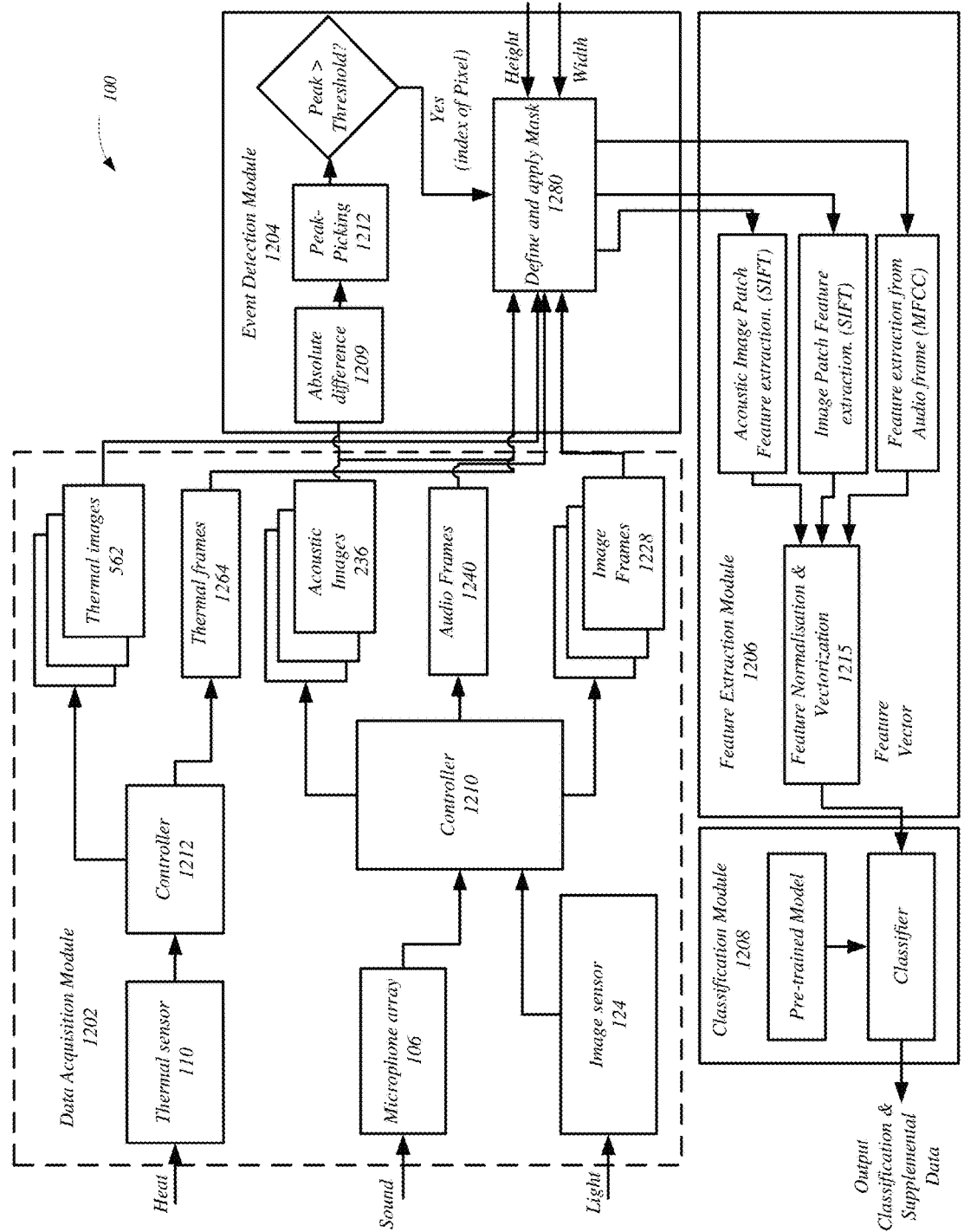
FIG. 12B illustrates an example process flow of the example methodology of FIG. 12A.

FIG. 12B illustrates an example process flow for the method 1200 as spatial analysis and beamforming is carried out, in accordance with some embodiments. The example method 1200 includes acts of acquiring sound, image, and heat data 1252 of a defined physical space 102 to generate spatially and temporally aligned acoustic images, thermal images, and image data (i.e., spatially and temporally aligned scene of acoustic, thermal, and image data streams); detecting one or more sound or thermal objects 1254 within the aligned acoustic image, aligned thermal image, and aligned image data; extracting 1256 features of the one or more detected sound and/or thermal objects; and classifying sound and/or thermal object features 1258 to empirically or theoretically determine one or more conditions causing the sound or thermal objects, and outputting classification data 1260. Method 1200 begins in act 1250.

As shown, the example method 1200 includes an act of acquiring 1252 sound, image, and thermal data of an observed scenes of defined physical space 102 to generate spatially and temporally aligned acoustic, image, and/or thermal data streams. Referring to FIG. 12B, the act of acquiring 1252 sound, image, and thermal data from a defined physical space is represented within the example process flow as data acquisition module 1202. In some embodiments the data acquisition device 104 may comprise data acquisition module 1202. It should be appreciated that the data acquisition module 1202 can be accurately referred to as a scene acquisition module, in some example embodiments, as the data acquisition module 1202 can be configured to monitor a defined physical space (including all objects therein) and not just one particular piece of equipment or object. Note that each of the modules 1204, 1206 and 1208 may be implemented as hardware, software, or any combination thereof within the CAV controller 232 or the TI controller 558. Further note, the CAV controller 232 and/or the TI controller 558 may be configured to perform routines similar to those of the data acquisition module 1202. Some such routines can include spatially aligning acoustic image(s) 236, audio frames 1140, and image frame(s) 1228 or generating acoustic images and various signal processing related to spatial filtering of the defined physical space (e.g., beamforming). As shown, the data acquisition module 1202 can be configured to capture and provide acoustic images, thermal images, image frames, audio data, and thermal data in real-time from the defined physical space 102. It should be appreciated that data acquisition module 1202 may be optional or configured differently to enable prospective scene analysis and condition monitoring. For example, the system 100 can be configured such that captured audio, image, and thermal data of a previously observed scene can be retrieved from an external location (e.g., a memory, a network location, or other storage location) and processed using the spatial analysis and filtering techniques (e.g., through modules 1204-1208) variously disclosed herein.

In addition, and in an embodiment, data acquisition module 1202 may be implemented by two or more separate devices, with each device being configured to capture different aspects of the scene (e.g., a camera device to capture light images, an acoustic image controller to render sound intensities, a thermal image controller to render thermal intensities, and one or more external microphone arrays). To this end, the data acquisition module 1202 shown in FIG. 12B should not be construed as limiting. Other implementations will be apparent in light of this disclosure, such as hybrid configurations wherein live analysis by system 100 can be switched to prospective analysis, if desired.

In the example embodiment shown in FIG. 12A, data acquisition module 1202 can implement techniques for spatially analyzing frames of audio in order to generate an acoustic image 236 of an observed scene. It should be appreciated that other techniques for spatial analysis can be utilized and are within the scope of the disclosure. While spatial analysis techniques can be advantageously used to generate both spatially filtered audio and an acoustic image, other similar techniques for spatial analysis do not generate spatially filtered audio. Instead, they create spatial spectrums. Two such techniques, for example, are known as Multiple Signal Classification (MUSIC) algorithm and estimation of signal parameters via rotational invariance techniques (ESPRIT). Such techniques can be used to generate high resolution acoustic images. To this end, these acoustic images can be used in addition, or as an alternative, to the acoustic images generated by beamforming techniques. The embodiments are not limited in this context.

Although the example embodiments discussed below reference one specific implementation of so-called "delay-and-sum" or "zero-forcing" beamforming, other beamforming techniques will be apparent in light of this disclosure. For example, filter-and-sum and adaptive beamforming techniques can also be utilized. As previously discussed, acoustic imaging visualizes the origin as an intensity of sound waves based on varying pixel intensities relative to the sound pressure detected at a plurality of points (e.g., each spatial position of a microphone array). Within the context of the example microphone array 106 of FIG. 1B, each microphone device can be positioned at discrete points in a predefined area. To this end, superposition of all microphone signals from microphone array 106 enables the estimation of the sound pressure for each targeted spatial point, which translates to one or more pixels of the generated acoustic image. In order to focus or otherwise target a certain point in an observed scene, the microphone array 106 does not necessarily have to be physically moved. Instead, through applying a series of appropriate delays across the microphones and summing all signals from the same, a particular point in an observed scene (e.g., angle of arrival) can be focused on (e.g., steered to). This delay-and-sum technique essentially delays the signals from each microphone in such a way that all sound waves emanating from a target point in an observed scene are in-phase, and thus, when added together, amplify sound waves emanating from that target point. Those sound waves emanating from other (non-targeted) points in an observed scene are out of phase and, as a result, are attenuated.

By way of example, consider one specific example embodiment of data acquisition device 104 implementing some such beamforming techniques. The array of microphones 106 may include an 8×8 pattern of microphones in discrete positions in a linear array totaling 64 discrete spatial points to measure acoustic pressure. In this example embodiment, each microphone device has identical sensitivity and frequency response and is configured to produce a sound signal sampled at, for example, 16 kHz with a 16 bit word depth. In addition, the image sensor 114 can be configured to produce image frames having, for example, a 256×256 (65536 pixels) resolution. For the purpose of clarity and ease of computation, examples embodiments disclosed herein assume a 16 kHz audio sample rate and a 256×256 (65536 pixel) image frame, but it should be appreciated that other audio sampling rates and image resolutions could be utilized, as needed, and are within the scope of this disclosure. As discussed above, the microphone array 106, the image sensor 114, and the thermal sensor 110 may be configured such that they align spatially. In addition, the microphone array 106, the image sensor 114, and the thermal sensor 110 can be aligned temporally based on a common clock or other timing scheme to insure the data streams are in sync (e.g., near real-time or achieved through post-processing routines).

During a first stage, and in accordance with an embodiment, the controller 1210 partitions sound signals from each microphone of the microphone array 106 into overlapping contiguous frames having, for instance, 32 milliseconds of duration represented within 512 samples. A synchronous frame from each microphone 202 (e.g., 64 frames), is then processed by a beamforming algorithm within the controller 1210. The result of the beamforming algorithm is 65536 spatially filtered frames of audio 1140 corresponding to each image frame captured by the image sensor 114. Stated differently, beamforming techniques can enable digital steering of captured audio signals via a spatial filter such that each of the 65536 unique angles of arrival corresponds to a filtered frame of audio. The embodiments are not limited in this context.

During a second stage, and in accordance with an embodiment, acoustic images 236 are generated by computing the energy (intensities) in each of these audio frames 1140 and converting the intensities into a 2-D grid to render a 256× 256 image (e.g., 65535 pixels). The embodiments are not limited in this context.

During a third and fourth stage, and in accordance with an embodiment, controller 1212 receives thermal signals from the thermal sensor 110 and generates thermal images 562. Thermal images 562 may be generated by computing the energy (intensities) in each of the thermal frames 1264 and converting the intensities into a 2-D grid to render a 256× 256 image (e.g., 65535 pixels). The resulting acoustic images 236, thermal images 562, corresponding audio frames 1140, image frames 1228, and thermal frames 1264 are then provided to the event detection module 1204 for identification of sound and/or thermal objects. The embodiments are not limited in this context.

With reference to FIG. 12B, and with additional reference to FIG. 12A, after the data acquisition module 1202 generates data streams including the acoustic images 236, thermal images 562, audio frames 1140, image frames 1228, and thermal frames 1264, the method continues with detecting 1256 sound and/or thermal objects within images of these data streams. Referring to FIG. 12B, detecting 1256 sound and/or thermal objects within data streams generated by the data acquisition module 1202 is represented with the example process flow as event detection module 1204. In a general sense, and in accordance with an embodiment, the event detection module 1204 analyses the stream of acoustic images 236 and thermal images 562 for the location of changes in the sound field and thermal energy field in the defined physical space that indicates or otherwise suggests sound and/or thermal objects occurring in an observed scene of the defined physical space.

In an embodiment, the event detection module 1204 creates a stream of delta images by determining 1209 an absolute difference between successive acoustic images 236 or thermal images 562. In some embodiments, the stream of delta images include acoustic/thermal overlay images 976. In some cases, delta images are generated based on calculating the squared distance between successive images 236, 562. In other cases, other suitable image comparison routines can be utilized to generate delta images, as will be apparent in light of this disclosure. In any such cases, peaks in each delta image are determined based on comparing pixel values within delta images against threshold intensity values. In an embodiment, the threshold is user-configurable or otherwise predetermined and represents a minimum pixel intensity whereby delta pixel intensities exceeding that value are registered as related to sound or thermal objects. To this end, when a delta pixel exceeds the threshold value, the index of the pixel is utilized to define and apply a mask 1280 within image frames 1228. In an embodiment, the applied mask 1280 comprises a rectangular shape or other geometry (e.g., a circle, square, or other shape) that denotes the event (i.e. sound and/or thermal object) location (or position), also referred to herein as a point of interest. The parameters regarding the applied mask 1280 can be user-defined and can include, for example, line thickness, line color, corner rounding values, and line type (e.g., broken, continuous, or dotted lines). In addition, parameters such as height and width of the applied mask 1280 can be predetermined and/or user-supplied. The embodiments are not limited in this context.

Applying mask 1280 can enable the event detection module 1204 to isolate/localize the corresponding portions of the image frame(s) 1228 and the corresponding acoustic and thermal image frames(s) 236, 562 for each respective sound and/or thermal object such that each sound and/or thermal object can be individually processed and classified, according to an embodiment. In an embodiment, the audio and or thermal frames 1140, 1264 associated with each masked region 1280 can be summed and averaged to render a frame of audio for each respective event. Other suitable techniques for audio signal processing may be utilized to render the frame of audio for each event, as will be apparent in light of this disclosure. In some cases, the correlated and isolated portions of acoustic image and thermal image data and image data may be referred to as so-called "patches." In an embodiment, these patches of acoustic or thermal image data along with rendered audio or thermal frames 1240, 1264 for each sound and/or thermal objects are provided to the feature extraction module 1206.

With further reference to FIG. 12A, after one or more sound or thermal objects are detected by the event detection module 1204, the method continues with extracting 1258 features (e.g., active sound objects) from isolated event regions/patches (i.e., sound and thermal objects). Referring to FIG. 12B, extracting 1258 features from the isolated event regions is represented within the example process flow as feature extraction module 1206. As shown, each portion of an acoustic image 236, image frames 1228, thermal image 562, audio frames 1140, and/or thermal frames 1264 are processed by a corresponding feature extraction routine. Each of these feature extraction routines will now be discussed in turn. In an embodiment, features within regions/patches of the acoustic image, thermal image, and/or the image frames 1228 are analyzed via a scale invariant feature transform (SIFT) or other suitable routine for extracting salient/relevant features from images. In some cases, SIFT and SIFT-based derivative routines are particularly well-suited for compensating for small amount of movement due to, for instance, an unsteady hand holding a smart device comprising the system 100 or because of movements in the observed scene. The result of such SIFT processing includes active sound object identification and, in some embodiments, a so-called "feature description" of the active sound object. Each can be utilized to perform active sound object recognition. As will be appreciated in light of this disclosure, such an approach is particularly advantageous as objects among clutter and partial occlusion can still be reliably identified. The embodiments are not limited in this context.

In an embodiment, audio content from each sound object generated by the event detection module 1204 can be analyzed to recognize sounds and/or to perform voice recognition. In an embodiment, audio content can be analyzed using Mel-frequency Cepstral coefficients (MFCCs) or other suitable sound-analysis routine as will be apparent in light of this disclosure. In an embodiment, MFCCs are particularly well-suited for a range of applications as MFCCs are typically used in both speech recognition and sound scene analysis. The embodiments are not limited in this context.

In an embodiment, after visual, audio, and/or thermal features have been extracted for each event in accordance with the feature extraction routines discussed above, the derived features are then sent to the feature normalization and vectorization module 1215. In this embodiment, the extracted features (e.g., from acoustic image patches, image patches, thermal image patches, and/or rendered audio frame) are combined and aggregated to create a feature vector for each detected sound and/or thermal object. In an embodiment, the feature vector may comprise one or more formats including, for example, binary data structures, XML, JSON, or other suitable machine readable format. As will be discussed below, this combination of acoustic image data, thermal image data, image data, and audio content form a multi-dimensional event signature that can be utilized by various techniques disclosed herein to perform sophisticated analysis of a scene of the defined physical space. As should be appreciated, these techniques enable accurate scene analysis in complex sound environments, wherein two or more co-occurring sounds can be distinguished amongst a cacophony of interferences (background noise, non-critical noises, or any other ordinary or otherwise inconsequential noises). It may be appreciated that by utilizing thermal images 562, the ability to identify active sound objects amongst a cacophony of interferences can be greatly improved. In an embodiment, the feature extraction module 1206 then provides a feature vector for each event to the classification module 1208. The embodiments are not limited in this context.

With further reference to FIG. 12A, after features are extracted 1258 from each thermal and/or sound object, and a feature vector (multi-dimensional event signature) for each event is generated, the method continues with classifying 1260 scene features to determine an sound and/or thermal object classification and associated meta data (supplemental data). Referring to FIG. 12B, classifying 1260 event features from a feature vector for each detected event is represented within the example process flow as classification module 1208.

In an embodiment, the classification module 1208 attempts to classify each sound and/or thermal object from a corresponding feature vector generated by the feature extraction module 1206. In some cases, the classification is performed based on scoring the feature vector against a plurality of pre-trained models. More generally, the pre-trained models can comprise acoustic, visual, and/or thermal signatures that allow sound and/or thermal objects to be correlated (e.g., utilizing probability distributions) or otherwise classified to a class. To this end, techniques variously disclosed herein utilize sound and thermal objects and their particular characteristics to "finger print" each event, and utilize those fingerprints to empirically and/or theoretically determine a cause giving rise to those events. To this end, techniques variously disclosed herein advantageously fuse light data, acoustic image data, thermal image data, and sound data. As will be apparent in light of this disclosure, other suitable machine-learning techniques may be utilized to construct and analyze such fingerprints. In addition, these generated fingerprints can be stored and utilized during subsequent analysis (e.g., for on-going training of the sound source localization system 100). The embodiments are not limited in this context.

In one specific example utilizing GMM-based machine learning, a 29 dimension GMM (13 dimensions for acoustic image, thermal image, image, sound, and heat data respectively), can be predetermined for each event class a priori. In these cases, the pre-defined event models are configured during, for instance, manufacture of the device. In other cases, these pre-defined event models are learned or otherwise added to the system 100 over time through, for example, a training routine or through adding and/or updating models from an external location (e.g., a network server, a USB thumb-drive, or other location). In one such example case, the system 100 can present information to a user related to detected event (e.g., visual images of the event, sound samples from the event, or other isolated and extracted features), whereby a user can select a user interface feature to manually classify and store the event (e.g., as a GMM model) such that future occurrences of the same or otherwise similar event may be properly recognized in the future. In addition, the user can associate supplemental data with the stored event including, for example, manuals, notes, pictures, or any other related metadata. In any such cases, an Expectation Maximization (EM) algorithm can be used to compute parameters for each model. To this end, each feature vector can be passed to each GMM resulting in a score for each class, with the scores being normalized (e.g., to 1) across classes such that a posteriori probability distribution is generated for each event. Thus the system 100 can deduce one or more conditions for each event based on one or more of the highest scoring models.

As should be appreciated in light of this disclosure, the model classes can represent a wide variety of conditions characterized by their acoustic, thermal, and/or visual signatures including, for instance, human beings, laptops, lights, or the like. In addition, the model classes can represent various intermediate states occurring within such objects and can be used to deduce, for instance, the progress of an ongoing condition including whether a condition is likely to cause an immediate issue (e.g., an active sound object moving out of one or more FOVs of the data acquisition device 104) To this end, and in accordance with an embodiment, the system 100 can provide an early warning to potential problems of accurately capturing audio of a meeting to a user or other interested party (e.g., another computer or process). In addition, the system 100 can include user-defined settings that govern the relative sensitivity of event detection, whereby a user can fine-tune the minimum severity level of an event prior to propagating the event to a user. The embodiments are not limited in this context.

In a more general sense, these models allow for each aspect/dimension of an event's signature to be taken into account so as to make an empirical or otherwise theoretical deduction as to what condition may be causing the sound event. For example, those aspects of the acoustic dimension of the event signature can be analyzed by each GMM to register similarities (e.g., such as between pixel intensities, pixel positions, and other acoustic, thermal, or visual similarities), and thus ultimately effect a resulting score. In other examples, other aspects and dimensions of the signatures can be combined and analyzed such that sound recognition and object identification each factor into the overall score. In addition, it should be appreciated that such sound recognition and object identification can be combined so as to provide context-aware understanding including, for instance, validating a recognized/identified sound based, in part, on confirming the identified object is capable of producing such a sound. In any such cases, if the score for each model utilized during classification exceeds a predetermined threshold for probability (e.g., 25%, 50%, and so on), the event vector is considered or is otherwise marked as related to the event model. In other embodiments, if the probability does not exceed the predetermined threshold, the event is ignored such that no alert or other indicator is displayed to a user (e.g., to mitigate false positives). Alternatively, those probabilities that do not exceed the predetermined threshold may be retained for future use by training routines and/or during other classification model refinements. Some such cases of when events could be ignored include not having a pre-stored model configured for the event. In addition, and other such cases, an event analyzed as indicative of normal operation of a machine may not be necessary to report to a user or to escalate the event for further action. In other embodiments, such events may not be ignored and could serve as a catalyst for a training routine, as discussed above, or to provide an indication to a user that machines/target scenes are operating within normal/expected parameters. In accordance with an embodiment, each event detected can result in a plurality of models scoring above the threshold. In this embodiment, each event can include a plurality of scores ordered relative to those models having the highest score, and thus, being the most likely condition causing the event. The embodiments are not limited in this context.

Figure 13:
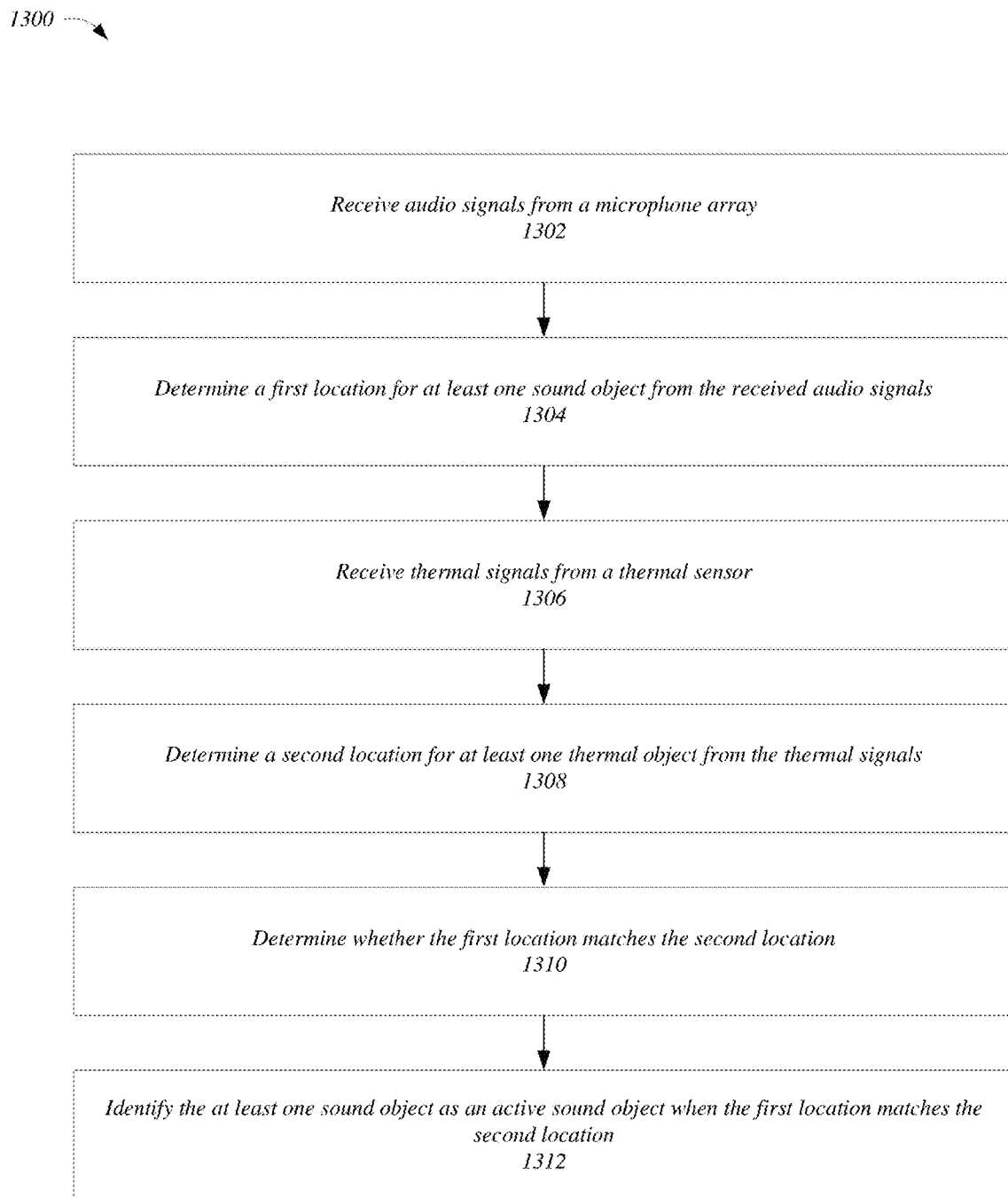
FIG. 13 illustrates an embodiment of a first logic flow.

FIG. 13 illustrates one embodiment of a logic flow 1300. The logic flow 1300 may be representative of some or all of the operations executed by one or more embodiments described herein, such as the system 100 or the acoustic sound source localizer 122.

In the illustrated embodiment shown in FIG. 13, the logic flow 1300 may receive audio signals from a microphone array at block 1302. For example, the acoustic component 130 may receive audio signals from microphone array 106. The audio signals may be captured from the defined physical space 102. The logic flow 1300 may determine a first location for at least one sound object from the received audio signals at block 1304.

The logic flow 1300 may receive thermal signals from a thermal sensor at block 1306. For example, the thermal component 156 may receive thermal signals from thermal sensor 110. The thermal signals may be captured from the defined physical space 102. In some embodiments the at least one thermal object may be representative of a human being. At block 1308, a second location for at least one thermal object may be determined from the thermal signals.

The logic flow 1300 may determine whether the first location matches the second location at block 1310. When the first location matches the second location, the at least one sound object may be identified as an active sound object 174. In some embodiments, when the first and second locations approximately match, the at least one sound object may be identified as the active sound object 174.

FIG. 14 illustrates one embodiment of a logic flow 1400. The logic flow 1400 may be representative of some or all of the operations executed by one or more embodiments described herein, such as the system 100 or the acoustic sound source localizer 122.

In the illustrated embodiment shown in FIG. 14, the logic flow 1400 may receive audio signals from a microphone array and image signals from an image sensor at blocks 1402 and 1404, respectively. The received audio signals and the received image signals may be used to generate an acoustic image that includes at least one sound object at block 1406. For example, the CAV controller 232 may generate acoustic image 236.

The logic flow 1400 may select a sub-set of pixels from a set of pixels of the acoustic image at block 1408. For example, the CAV controller 232 may select the sub-set of pixels. A sound energy value for the sub-set of pixels may be generated at block 1410.

The logic flow 1400 may determine when a sound energy value for a sub-set of pixels is greater than or equal to a sound energy threshold at block 1412. In some embodiments the sound energy threshold may be predetermined by a user or dynamically adjusted according to machine learning algorithms. When the sound energy value for the sub-set of pixels is greater than or equal to the sound energy threshold, the sub-set of pixels may be identified as the at least one sound object at block 1414. In some embodiments the at least one sound object identification may include a location of the at least one sound object in the defined physical space.

FIG. 15 illustrates one embodiment of a logic flow 1500. The logic flow 1500 may be representative of some or all of the operations executed by one or more embodiments described herein, such as the system 100 or the acoustic sound source localizer 122.

In the illustrated embodiment shown in FIG. 15, the logic flow 1500 may receive thermal signals from a thermal sensor at block 1502. For example, the thermal component may receive thermal signals from a thermal camera. The received thermal signals may be used to generate a thermal image that includes at least one thermal object at block 1406. For example, the TI controller 558 may generate thermal image 562.

The logic flow 1500 may select a sub-set of pixels from a set of pixels of the thermal image at block 1506. For example, the TI controller 558 may select the sub-set of pixels. A thermal energy value for the sub-set of pixels may be generated at block 1508.

The logic flow 1500 may determine when a thermal energy value for a sub-set of pixels is greater than or equal to a thermal energy threshold at block 1510. In some embodiments the thermal energy threshold may be predetermined by a user or dynamically adjusted according to machine learning algorithms. In some embodiments the thermal energy threshold represents a heat signature for a human being. When the thermal energy value for the sub-set of pixels is lesser than or equal to the thermal energy threshold, the sub-set of pixels may be identified as not the at least one thermal object at block 1512. In an alternate example, when the thermal energy value for the sub-set of pixels is greater than or equal to the thermal energy threshold, the sub-set of pixels may be identified as the at least one thermal object. In some embodiments the at least one thermal object identification may include a location of the at least one thermal object in the defined physical space.

FIG. 16 illustrates one embodiment of a logic flow 1600. The logic flow 1600 may be representative of some or all of the operations executed by one or more embodiments described herein, such as the system 100 or the acoustic sound source localizer 122.

In the illustrated embodiment shown in FIG. 16, the logic flow 1600 may receive an acoustic image having at least one sound object and a thermal image having at least one thermal object at block 1602. For example, the analysis component 150 may receive acoustic image 236 from acoustic component 130 and thermal image 562 from thermal component 156. The images 236, 562 may be based on physical quantities measured by the data acquisition device 104.

The logic flow 1600 may determine whether a first location for the at least one sound object from the acoustic image matches a second location for the at least one thermal object from the thermal image at block 1604. When the first and second location match, the at least one sound object may be identified as the active sound object at block 1606. The matching first and second locations may then be identified as the location for the active sound object at block 1608. In some embodiments the active sound object may represent a human being speaking.

Figure 17:
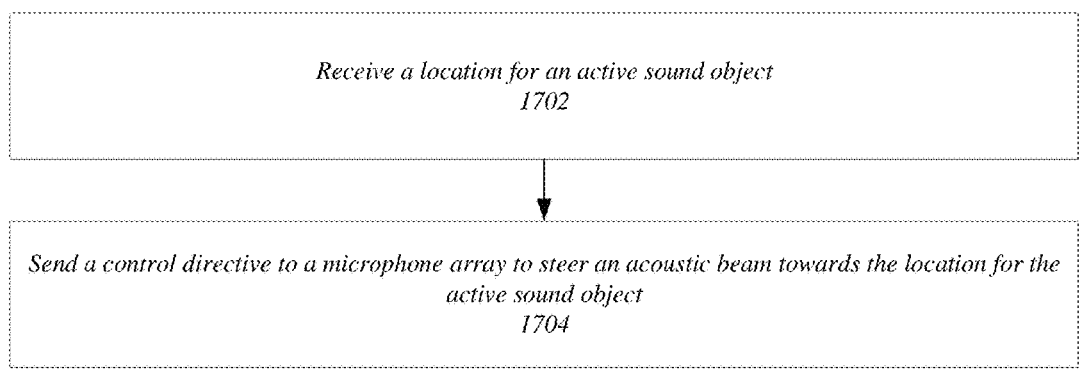
FIG. 17 illustrates an embodiment of a fifth logic flow.

FIG. 17 illustrates one embodiment of a logic flow 1700. The logic flow 1700 may be representative of some or all of the operations executed by one or more embodiments described herein, such as the system 100 or the acoustic sound source localizer 122.

In the illustrated embodiment shown in FIG. 17, the logic flow 1700 may receive a location for an active sound object. For example, the analysis component 150 may provide an active sound object location 174 to the microphone control component 177. In some embodiments the active sound object may be a meeting participant 120.

The logic flow 1700 may send a control directive to a microphone array to steer an acoustic beam towards the location for the active sound object at block 1704. For example, the acoustic beam may be steered away from a previous active speaker to and current active speaker in response to the control directive. In various embodiments the location for the active sound object is determined from an acoustic image and a thermal image 236, 562. In various such embodiments the acoustic image and the thermal image may be superimposed to generate an acoustic/thermal energy overlay 976.

FIG. 18 illustrates an embodiment of a storage medium 1800. Storage medium 1800 may comprise any non-transitory computer-readable storage medium or machine-readable storage medium, such as an optical, magnetic or semiconductor storage medium. In various embodiments, storage medium 1800 may comprise an article of manufacture. In some embodiments, storage medium 1800 may store computer-executable instructions, such as computer-executable instructions to implement one or more of logic flows 1300, 1400, 1500, 1600, 1700 of FIGS. 13-17. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 19:
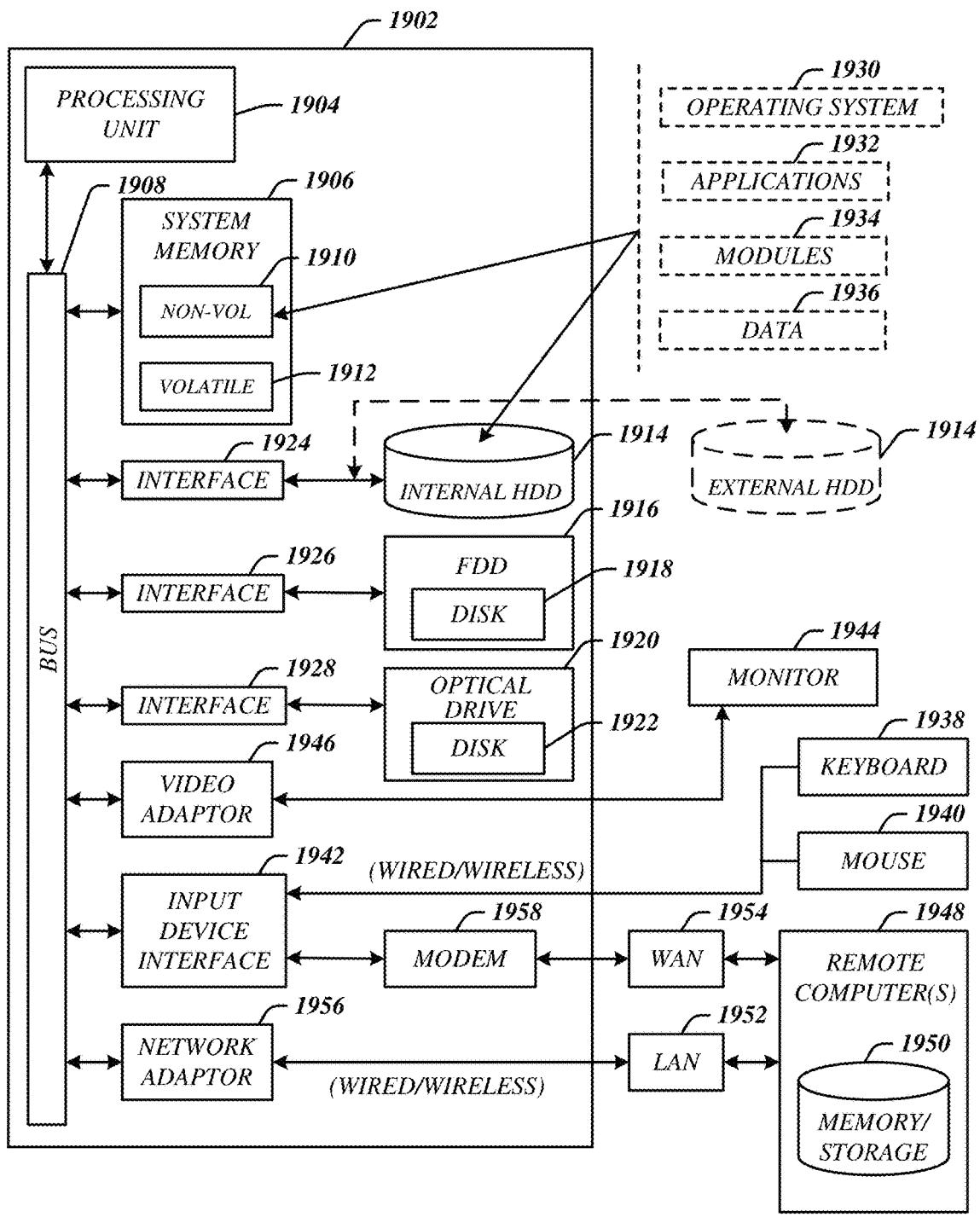
FIG. 19 illustrates an embodiment of a computing architecture.

FIG. 19 illustrates an embodiment of an exemplary computing architecture 1900 that may be suitable for implementing various embodiments as previously described. In various embodiments, the computing architecture 1900 may comprise or be implemented as part of an electronic device. In some embodiments, the computing architecture 1900 may be representative, for example, of a processor server that implements one or more components of the sound source localization system 100. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1900.

As shown in FIG. 19, the computing architecture 1900 comprises a processing unit 1904, a system memory 1906 and a system bus 1908. The processing unit 1904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1904.

The system bus 1908 provides an interface for system components including, but not limited to, the system memory 1906 to the processing unit 1904. The system bus 1908 can be any of several types of bus structure that may further interconnect to a memory bus (with or without a memory controller), a peripheral bus, and a local bus using any of a variety of commercially available bus architectures. Interface adapters may connect to the system bus 1908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 19, the system memory 1906 can include non-volatile memory 1910 and/or volatile memory 1912. A basic input/output system (BIOS) can be stored in the non-volatile memory 1910.

The computer 1902 may include various types of computer-readable storage media in the form of one or more lower speed memory units, including an internal (or external) hard disk drive (HDD) 1914, a magnetic floppy disk drive (FDD) 1916 to read from or write to a removable magnetic disk 1918, and an optical disk drive 1920 to read from or write to a removable optical disk 1922 (e.g., a CD-ROM or DVD). The HDD 1914, FDD 1916 and optical disk drive 1920 can be connected to the system bus 1908 by a HDD interface 1924, an FDD interface 1926 and an optical drive interface 1928, respectively. The HDD interface 1924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1910, 1912, including an operating system 1930, one or more application programs 1932, other program modules 1934, and program data 1936. In one embodiment, the one or more application programs 1932, other program modules 1934, and program data 1936 can include, for example, the various applications and/or components of the system 100.

A user can enter commands and information into the computer 1902 through one or more wire/wireless input devices, for example, a keyboard 1938 and a pointing device, such as a mouse 1940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1904 through an input device interface 1942 that is coupled to the system bus 1908, but can be connected by other interfaces such as a parallel port, IEEE 1394 serial port, a game port, a USB port, an IR interface, and so forth.

A monitor 1944 or other type of display device is also connected to the system bus 1908 via an interface, such as a video adaptor 1946. The monitor 1944 may be internal or external to the computer 1902. In addition to the monitor 1944, a computer typically includes other peripheral output devices, such as speakers, printers, and so forth.

The computer 1902 may operate in a networked environment using logical connections via wire and/or wireless communications to one or more remote computers, such as a remote computer 1948. The remote computer 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wire/wireless connectivity to a local area network (LAN) 1952 and/or larger networks, for example, a wide area network (WAN) 1954. Such LAN and WAN networking environments are commonplace in offices and companies, and facilitate enterprise-wide computer networks, such as intranets, all of which may connect to a global communications network, for example, the Internet.

When used in a LAN networking environment, the computer 1902 is connected to the LAN 1952 through a wire and/or wireless communication network interface or adaptor 1956. The adaptor 1956 can facilitate wire and/or wireless communications to the LAN 1952, which may also include a wireless access point disposed thereon for communicating with the wireless functionality of the adaptor 1956.

When used in a WAN networking environment, the computer 1902 can include a modem 1958, or is connected to a communications server on the WAN 1954, or has other means for establishing communications over the WAN 1954, such as by way of the Internet. The modem 1958, which can be internal or external and a wire and/or wireless device, connects to the system bus 1908 via the input device interface 1942. In a networked environment, program modules depicted relative to the computer 1902, or portions thereof, can be stored in the remote memory/storage device 1950. It will be appreciated that the network connections shown are exemplary and other means of establishing a communications link between the computers can be used.

The computer 1902 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 20:
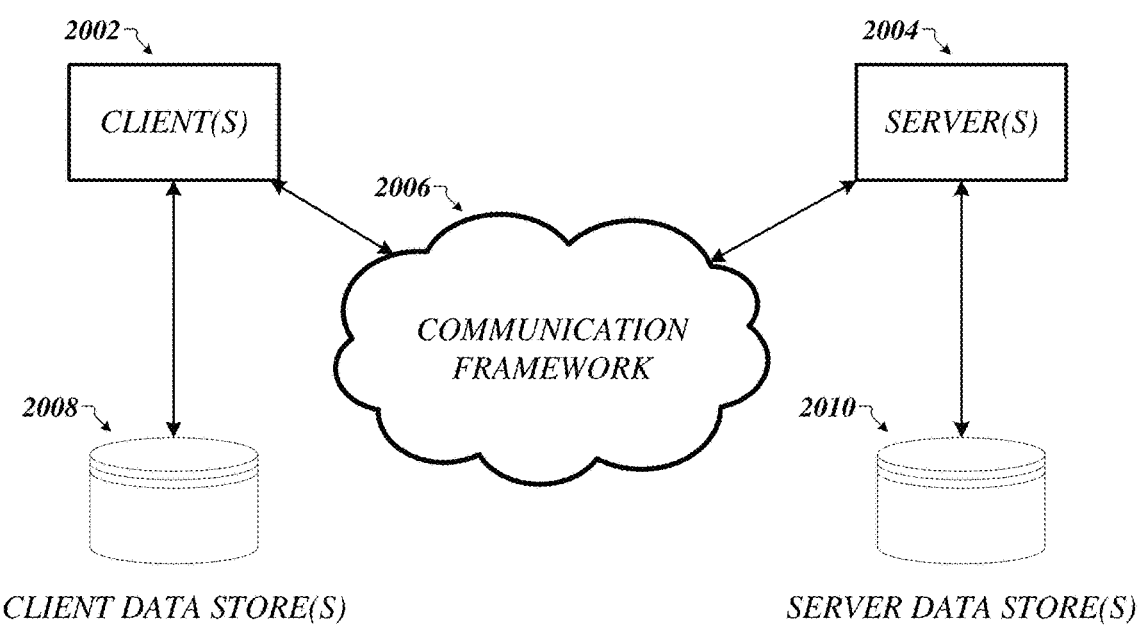
FIG. 20 illustrates an embodiment of a communications architecture.

FIG. 20 illustrates a block diagram of an exemplary communications architecture 2000 suitable for implementing various embodiments as previously described. The communications architecture 2000 includes various common communications elements, such as a transmitter, receiver, transceiver, radio, network interface, baseband processor, antenna, amplifiers, filters, power supplies, and so forth. The embodiments, however, are not limited to implementation by the communications architecture 2000.

As shown in FIG. 20, the communications architecture 2000 comprises includes one or more clients 2002 and servers 2004. The clients 2002 and the servers 2004 are operatively connected to one or more respective client data stores 2008 and server data stores 2010 that can be employed to store information local to the respective clients 2002 and servers 2004, such as cookies and/or associated contextual information. In various embodiments, any one of servers 2004 may implement one or more of logic flows 1300-1700 of FIGS. 13-17, and storage medium 1800 of FIG. 18 in conjunction with storage of data received from any one of clients 2002 on any of server data stores 2010.

The clients 2002 and the servers 2004 may communicate information between each other using a communication framework 2006. The communications framework 2006 may implement any well-known communications techniques and protocols. The communications framework 2006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2002 and the servers 2004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is apparatus comprising logic, at least a portion of which is implemented in hardware, the logic comprising an acoustic sound source localizer to identify a location for an active sound object within a defined physical space, the acoustic sound source localizer comprising an acoustic component, a thermal component, and an analysis component. The acoustic component to receive audio signals, determine a set of sound objects from the received audio signals, and determine an approximate location for at least one of the sound objects within the defined physical space. The thermal component to receive thermal signals, determine a set of thermal objects from the received thermal signals, and determine an approximate location for at least one of the thermal objects within the defined physical space. The analysis component to receive the approximate locations, determine whether the approximate location for the at least one sound object matches the approximate location for the at least one thermal object, and identify the at least one sound object as the active sound object when the approximate locations match.

Example 2 includes the subject matter of Example 1, where the at least one sound object represents a human being.

Example 3 includes the subject matter of Example 1-2, where the at least one thermal object represents a human being.

Example 4 includes the subject matter of Examples 1-3, where the active sound object represents a human being engaged in active speaking.

Example 5 includes the subject matter of Examples 1-4, where the acoustic component comprises a computer audio vision controller to receive as input audio signals and image signals, generate an acoustic image based on the received audio signals and the received image signals, and output the acoustic image. The acoustic image including the at least one sound object within the defined physical space.

Example 6 includes the subject matter of Example 5, where the computer audio vision controller comprises part of an acoustic camera.

Example 7 includes the subject matter of Example 5, where the acoustic image comprises a visual representation of sound energy in a scene of the defined physical space.

Example 8 includes the subject matter of Example 5, where the acoustic image to represents an image of the defined physical space at a given moment in time and the acoustic image comprises a multi-dimensional set of pixels with each pixel representing a level of sound energy.

Example 9 includes the subject matter of Example 5, where the computer audio vision controller selects a sub-set of pixels from a set of pixels of the acoustic image, and generates a sound energy value for the sub-set of pixels.

Example 10 includes the subject matter of Example 5, where the computer audio vision controller determines when a sound energy value for a sub-set of pixels is greater than or equal to a sound energy threshold, and identifies the sub-set of pixels as the at least one sound object.

Example 11 includes the subject matter of Examples 1-10, where the thermal component comprises a thermal image controller to receive as input thermal signals, generate a thermal image based on the received thermal signals, and output the thermal image. The thermal image including the at least one thermal object within the defined physical space.

Example 12 includes the subject matter of Example 11, where the thermal image comprises a visual representation of thermal energy in a scene of the defined physical space.

Example 13 includes the subject matter of Example 11, where the thermal image comprises a multi-dimensional set of pixels with each pixel representing a level of thermal energy.

Example 14 includes the subject matter of Example 11, where the thermal image controller selects a sub-set of pixels from a set of pixels of the thermal image, and generates a thermal energy value for the sub-set of pixels.

Example 15 includes the subject matter of Example 11, where the thermal image controller determines when a thermal energy value for a sub-set of pixels is greater than or equal to a thermal energy threshold, and identifies the sub-set of pixels as the at least one thermal object.

Example 16 includes the subject matter of Examples 11-15, where the thermal energy threshold represents a heat signature for a human being.

Example 17 includes the subject matter of Example 11, where the thermal image controller determines when a thermal energy value for a sub-set of pixels is lesser than or equal to a thermal energy threshold, and identifies the sub-set of pixels as not the at least one thermal object.

Example 18 includes the subject matter of Examples 11-17, where the thermal energy threshold represents a heat signature for a non-human object.

Example 19 includes the subject matter of Examples 1-18, where the analysis component comprises an image analysis component to receive an acoustic image, at least a portion of which represents the at least one sound object, and a thermal image, at least a portion of which represents the at least one thermal object, determines whether the approximate location for the at least one sound object from the acoustic image matches the approximate location for the at least one thermal object from the thermal image, and identifies the at least one sound object as the active sound object when the approximate locations match.

Example 20 includes the subject matter of Example 19, where the analysis component identifies the matching approximate locations as the location for the active sound object when the approximate locations match.

Example 21 includes the subject matter of Examples 1-20, where the acoustic sound source localizer comprises a microphone control component to control direction of an acoustic beam formed by a microphone array. The microphone control component to receive the location for the active sound object from the analysis component, and send control directives to the microphone array to steer the acoustic beam towards the location for the active sound object.

Example 22 includes the subject matter of Examples 1-21, where the logic is implemented as part of a system-on-chip (SOC).

Example 23 includes the subject matter of Examples 1-22, where the logic is implemented as part of a mobile computing device comprising a wearable device, a smartphone, a tablet, or a laptop computer.

Example 24 includes the subject matter of Examples 1-23, where multiple data acquisition devices are communicatively coupled to the logic, the multiple data acquisition devices including a microphone array, an image sensor, or a thermal sensor.

Example 25 includes the subject matter of Examples 5-10, where a microphone array is communicatively coupled to the logic, the microphone array to convert acoustic pressures from the defined physical space to proportional electrical signals, and output the proportional electrical signals as audio signals to the computer audio vision controller.

Example 26 includes the subject matter of Examples 1-25, where a microphone array is communicatively coupled to the logic, the microphone array comprising a directional microphone array arranged to focus on a portion of the defined physical space.

Example 27 includes the subject matter of Examples 1-25, where a microphone array is communicatively coupled to the logic, the microphone array comprising an array of microphone devices, the array of microphone devices comprising at least one of a unidirectional microphone type, a bi-directional microphone type, a shotgun microphone type, a contact microphone type, or a parabolic microphone type.

Example 28 includes the subject matter of Examples 5-10, where an image sensor is communicatively coupled to the logic, the image sensor to convert light from the defined physical space to proportional electrical signals, and output the proportional electrical signals as image signals to the computer audio vision controller.

Example 29 includes the subject matter of Examples 11-18, where one or more thermal sensors are communicatively coupled to the logic, the one or more thermal sensors to convert heat to proportional electrical signals, and output the proportional electrical signals as thermal signals to the thermal image controller.

Example 30 includes the subject matter of Examples 1-29, where multiple data acquisition devices are communicatively coupled to the logic, the multiple data acquisition devices having spatially aligned capture domains.

Example 31 is a computer-implemented method, comprising receiving audio signals from a microphone array, determining a first location for at least one sound object from the received audio signals, receiving thermal signals from a thermal sensor, determining a second location for at least one thermal object from the thermal signals, determining whether the first location matches the second location, and identifying the at least one sound object as an active sound object when the first location matches the second location.

Example 32 includes the subject matter of Example 31, further comprising identifying the at least one thermal object as representative of a human being.

Example 33 includes the subject matter of Examples 31-32, further comprising receiving image signals from an image sensor and generating an acoustic image based on the received audio signals and the received image signals, the acoustic image to include the at least one sound object within the acoustic image.

Example 34 includes the subject matter of Example 33, further comprising selecting a sub-set of pixels from a set of pixels of the acoustic image and generating a sound energy value for the sub-set of pixels.

Example 35 includes the subject matter of Example 34, further comprising determining when a sound energy value for a sub-set of pixels is greater than or equal to a sound energy threshold and identifying the sub-set of pixels as the at least one sound object.

Example 36 includes the subject matter of Examples 31-35, further comprising receiving the thermal signals and generating a thermal image based on the received thermal signals, the thermal image to include the at least one thermal object within the thermal image.

Example 37 includes the subject matter of Example 36, further comprising selecting a sub-set of pixels from a set of pixels of the thermal image and generating a thermal energy value for the sub-set of pixels.

Example 38 includes the subject matter of Example 37, further comprising determining when a thermal energy value for a sub-set of pixels is greater than or equal to a thermal energy threshold and identifying the sub-set of pixels as the at least one thermal object.

Example 39 includes the subject matter of Example 38, where the thermal energy threshold represents a heat signature for a human being.

Example 40 includes the subject matter of Example 37, further comprising determining when a thermal energy value for a sub-set of pixels is lesser than or equal to a thermal energy threshold and identifying the sub-set of pixels as not the at least one thermal object.

Example 41 includes the subject matter of Example 40, where the thermal energy threshold represents a heat signature for a non-human object.

Example 42 includes the subject matter of Examples 31-41, further comprising receiving an acoustic image and a thermal image, determining whether the first location for the at least one sound object from the acoustic image matches the second location for the at least one thermal object from the thermal image, and identifying the at least one sound object as the active sound object when the first and second locations match.

Example 43 includes the subject matter of Example 42, further comprising identifying the matching first and second locations as the location for the active sound object.

Example 44 includes the subject matter of Example 42, further comprising receiving the location for the active sound object and sending a control directive to the microphone array to steer an acoustic beam towards the location for the active sound object.

Example 45 is one or more computer-readable media to store instructions that when executed by a processor circuit causes the processor circuit to receive audio signals from a microphone array, determine a first location for at least one sound object from the received audio signals, receive thermal signals from a thermal sensor, determine a second location for at least one thermal object from the thermal signals, determine whether the first location matches the second location, and identify the at least one sound object as an active sound object when the first location matches the second location.

Example 46 includes the subject matter of Example 45, including instructions to receive image signals from an image sensor and generate an acoustic image based on the received audio signals and the received image signals. The acoustic image to include the at least one sound object within the acoustic image.

Example 47 includes the subject matter of Example 46, including instructions to select a sub-set of pixels from a set of pixels of the acoustic image and generate a sound energy value for the sub-set of pixels.

Example 48 includes the subject matter of Examples 46-47, including instructions to determine when a sound energy value for a sub-set of pixels is greater than or equal to a sound energy threshold and identify the sub-set of pixels as the at least one sound object.

Example 49 includes the subject matter of Examples 45-48, including instructions to receive the thermal signals and generate a thermal image based on the received thermal signals. The thermal image to include the at least one thermal object within the thermal image.

Example 50 includes the subject matter of Example 49, including instructions to select a sub-set of pixels from a set of pixels of the thermal image and generate a thermal energy value for the sub-set of pixels.

Example 51 includes the subject matter of Examples 49-50, including instructions to determine when a thermal energy value for a sub-set of pixels is greater than or equal to a thermal energy threshold and identify the sub-set of pixels as the at least one thermal object.

Example 52 includes the subject matter of Example 51, where the temperature threshold represents a heat signature for a human being.

Example 53 includes the subject matter of Example 49, including instructions to determine when a thermal energy value for a sub-set of pixels is lesser than or equal to a thermal energy threshold and identify the sub-set of pixels as not the at least one thermal object.

Example 54 includes the subject matter of Example 53, where the thermal energy threshold represents a heat signature for a non-human object.

Example 55 includes the subject matter of Examples 45-54, including instructions to receive an acoustic image and a thermal image, determine whether the first location for the at least one sound object from the acoustic image matches the second location for the at least one thermal object from the thermal image, and identify the at least one sound object as the active sound object when the first and second locations match.

Example 56 includes the subject matter of Examples 45-55, including instructions to identify the matching first and second locations as the location for the active sound object.

Example 57 includes the subject matter of Example 56, including instructions to receive the location for the active sound object and send a control directive to the microphone array to steer an acoustic beam towards the location for the active sound object.

Example 58 is an apparatus comprising a microphone array and a controller operatively coupled to the microphone array, the controller to control beamforming operations for the microphone array, the controller to receive a location for an active sound object from an acoustic sound source localizer, and send control directives to the microphone array to steer an acoustic beam from the microphone array towards the location for the active sound object.

Example 59 includes the subject matter of Example 58, where the active sound object comprises a human speaker.

Example 60 includes the subject matter of Examples 58-59, where the location is determined from an acoustic image and a thermal image.

Example 61 includes the subject matter of Examples 58-60, where the microphone array converts acoustic pressures from the defined physical space to proportional electrical signals, and outputs the proportional electrical signals as audio signals to the computer audio vision controller.

Example 62 includes the subject matter of Examples 58-61, where the microphone array comprises a directional microphone array arranged to focus on a portion of a defined physical space.

Example 63 includes the subject matter of Examples 58-62, where the microphone array comprises an array of microphone devices, the array of microphone devices comprising at least one of a unidirectional microphone type, a bi-directional microphone type, a shotgun microphone type, a contact microphone type, or a parabolic microphone type.

Examples 64 includes the subject matter of Examples 58-63, where an image sensor is operatively coupled to the controller. The image sensor to convert light from the defined physical space to proportional electrical signals, and output the proportional electrical signals as image signals to the acoustic sound source localizer.

Examples 65 includes the subject matter of Examples 58-64, where one or more thermal sensors are operatively coupled to the controller. The one or more thermal sensors to convert heat to proportional electrical signals, and output the proportional electrical signals as thermal signals to the thermal image controller.

Example 66 includes the subject matter of Examples 58-65, where multiple data acquisition devices are operatively coupled to the controller. The multiple data acquisition devices to include at least the microphone array and a thermal sensor, the microphone array and the thermal sensor having spatially aligned capture domains.

Example 67 includes the subject matter of Examples 58-66, where multiple data acquisition devices are operatively coupled to the controller. The multiple data acquisition devices to include at least the microphone array, an image sensor and a thermal sensor, the microphone array and the image sensor and the thermal sensor having spatially aligned capture domains.

Example 68 is a computer-implemented method, comprising receiving a location for a first active sound object from an acoustic sound source localizer, wherein the location for the first active sound object is determined from an acoustic image and a thermal image and sending control directives to a microphone array to steer an acoustic beam from the microphone array towards a location for a first active sound object.

Example 69 includes the subject matter of Example 68, further comprising receiving a location for a second active sound object from the acoustic sound source localizer, wherein the location for the second active sound object is determined from an acoustic image and a thermal image.

Example 70 includes the subject matter of Example 69, further comprising sending control directives to the microphone array to steer the acoustic beam from the location of the first active sound object towards a location for a second active sound object.

Example 71 includes the subject matter of Example 68, further comprising converting acoustic pressures from a defined physical space to proportional electrical signals.

Example 72 includes the subject matter of Example 68, further comprising sending proportional electrical signals as audio signals to the acoustic sound source localizer.

Example 73 is one or more computer-readable media to store instructions that when executed by a processor circuit causes the processor circuit to receive a location for a first active sound object from an acoustic sound source localizer, wherein the location for the first active sound object is determined from an acoustic image and a thermal image and send control directives to a microphone array to steer an acoustic beam from the microphone array towards a location for a first active sound object.

Example 74 includes the subject matter of Example 73, including instructions to receive a location for a second active sound object from the acoustic sound source localizer, wherein the location for the second active sound object is determined from an acoustic image and a thermal image.

Example 75 includes the subject matter of Example 73, including instructions to send control directives to the microphone array to steer the acoustic beam from the location of the first active sound object towards a location for a second active sound object.

Example 76 includes the subject matter of Example 73, including instructions to send control signals to the microphone array to convert acoustic pressures from a defined physical space to proportional electrical signals.

Example 77 includes the subject matter of Example 73, including instructions to send control directives to the microphone array to send proportional electrical signals as audio signals to the acoustic sound source localizer.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, comprising:
   a sound sensor to receive audio signals;
   a thermal sensor to receive thermal signals;
   a processor coupled to the sound sensor and the thermal sensor; and
   memory comprising instructions, which when executed by the processor cause the processor to:
      receive an image;
      identify a plurality of sound objects from the received audio signals;
      generate an acoustic image from the received audio signals and the received image, the acoustic image to include the plurality of sound objects;
      determine approximate locations for each of the plurality of sound objects based in part on the acoustic image;
      identify a plurality of thermal objects from the received thermal signals based at least in part on a threshold thermal energy value;
      determine approximate locations for each of the plurality of thermal objects;
      determine whether an approximate location for a one sound object of the plurality of sound objects matches an approximate location for a one thermal object of the plurality of thermal objects; and
      identify the one sound object of the plurality of sound objects as an active sound object based on a determination that the approximate location for the one sound object of the plurality of sound objects matches the approximate location for the one thermal object of the plurality of thermal objects.

2. The apparatus of claim 1, the active sound object to represent a human being engaged in active speaking.

3. The apparatus of claim 1, the memory further comprising instructions that when executed by the processor cause the processor to:
   generate a thermal image based on the received thermal signals, the thermal image to include the plurality of thermal object within the thermal image.

4. The apparatus of claim 3, the memory further comprising instructions that when executed by the processor cause the processor to:
   determine whether the approximate location for the one sound object of the plurality of sound objects matches the approximate location for the one thermal object of the plurality of thermal objects based on the locations of the plurality of sound objects from the acoustic image and the locations of the plurality of thermal objects from the thermal image.

5. The apparatus of claim 1, the sound sensor comprising a microphone array, the memory further comprising instructions that when executed by the processor cause the processor to send control directives to the microphone array to steer an acoustic beam formed by the microphone array towards the location for the active sound object.

6. The apparatus of claim 1, the processor and memory implemented as part of a system-on-chip (SOC).

7. The apparatus of claim 1, the apparatus implemented as part of a mobile computing device comprising a wearable device, a smartphone, a tablet, or a laptop computer.

8. A computer-implemented method, comprising:
   receiving audio signals from a microphone array;
   receiving an image;
   identifying a plurality of sound objects from the received audio signals;
   generating an acoustic image from the received audio signals and the received image, the acoustic image to include the plurality of sound objects;
   determining approximate locations for each of the plurality of sound objects based in part on the acoustic image;
   receiving thermal signals from a thermal sensor;
   identifying a plurality of thermal objects from the thermal signals based at least in part on a threshold thermal energy value;
   determining approximate locations for each of the plurality of thermal objects;
   determining whether an approximate location for a one sound object of the plurality of sound objects matches an approximate location for a one thermal object of the plurality of thermal objects; and
   identifying the one sound object of the plurality of sound objects as an active sound object based on a determination that the approximate location for the one sound object of the plurality of sound objects matches the approximate location for the one thermal object of the plurality of thermal objects.

9. The computer-implemented method of claim 8, comprising:
   generating a thermal image based on the received thermal signals and the received image signals, the thermal image to include the plurality of thermal object within the thermal image.

10. The computer-implemented method of claim 9, comprising:

determining whether the approximate location for the one sound object of the plurality of sound objects matches the approximate location for the one thermal object of the plurality of thermal objects from the thermal image based on the locations of the plurality of sound objects from the acoustic image and the locations of the plurality of thermal objects from the thermal image.

11. The computer-implemented method of claim 8, comprising:
sending a control directive to the microphone array to steer an acoustic beam towards the location for the active sound object.

12. One or more non-transitory computer-readable media to store instructions that when executed by a processor circuit causes the processor circuit to:
receive audio signals from a microphone array;
receive an image;
identify a plurality of sound objects from the received audio signals;
generate an acoustic image from the received audio signals and the received image, the acoustic image to include the plurality of sound objects;
determine approximate locations for each of the plurality of sound objects based in part on the acoustic image;
receive thermal signals from a thermal sensor;
identify a plurality of thermal objects from the thermal signals based at least in part on a threshold thermal energy value;
determine approximate locations for each of the plurality of thermal objects;
determine whether an approximate location for a one sound object of the plurality of sound objects matches an approximate location for a one thermal object of the plurality of thermal objects; and
identify the one sound object of the plurality of sound objects as an active sound object based on a determination that the approximate location for the one sound object of the plurality of sound objects matches the approximate location for the one thermal object of the plurality of thermal objects.

13. The one or more non-transitory computer-readable media of claim 12, with instructions to:
receive image signals from an image sensor; and
generate an acoustic image based on the received audio signals and the received image signals, the acoustic image to include the plurality of sound objects within the acoustic image.

14. The one or more non-transitory computer-readable media of claim 13, with instructions to:
generate a thermal image based on the received thermal signals and the received image signals, the thermal image to include the plurality of thermal object within the thermal image.

15. The one or more non-transitory computer-readable media of claim 14, with instructions to:
determine whether the approximate location for the one sound object of the plurality of sound objects matches the approximate location for the one thermal object of the plurality of thermal objects from the thermal image based on the locations of the plurality of sound objects from the acoustic image and the locations of the plurality of thermal objects from the thermal image.

16. The one or more non-transitory computer-readable media of claim 12, with instructions to:
send a control directive to the microphone array to steer an acoustic beam towards the location for the active sound object.

* * * * *